US012804230B2

(12) United States Patent
Carlson et al.

(10) Patent No.: US 12,804,230 B2
(45) **Date of Patent: *Nov. 17, 2026**

(54) SEAMLESS TIMERS

(71) Applicant: DISH Network L.L.C., Englewood, CO (US)

(72) Inventors: Jason Paul Carlson, Denver, CO (US); John Huynh, Thornton, CO (US); Seth Byerley, Parker, CO (US); Gowtham Ram Ramkumar, Englewood, CO (US); Mark John Sokald, Roxborough, CO (US); Yunfeng Yang, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/456,814

(22) Filed: Nov. 29, 2021

(65) Prior Publication Data

US 2022/0086527 A1 Mar. 17, 2022

Related U.S. Application Data

(63) Continuation of application No. 16/886,190, filed on May 28, 2020, now Pat. No. 11,218,770.

(51) Int. Cl.
*H04N 21/458* (2011.01)
*H04N 21/262* (2011.01)
(Continued)

(52) U.S. Cl.
CPC ... *H04N 21/4583* (2013.01); *H04N 21/26258* (2013.01); *H04N 21/4263* (2013.01); *H04N 21/4383* (2013.01); *H04N 21/47211* (2013.01)

(58) Field of Classification Search
CPC ......... H04N 21/4583; H04N 21/26258; H04N 21/47211; H04N 21/4383; H04N 21/4263
See application file for complete search history.

(56) References Cited

U.S. PATENT DOCUMENTS 7,917,008 B1 3/2011 Lee et al.
8,798,444 B1 * 8/2014 Crandall ............ H04N 21/4345 386/292
(Continued)

OTHER PUBLICATIONS

U.S. Appl. No. 16/885,972, filed May 28, 2020.
(Continued)

*Primary Examiner* — Yassin Alata
(74) *Attorney, Agent, or Firm* — Wash Park IP Ltd.; John T. Kennedy

(57) ABSTRACT

Devices, systems, and processes are described for seamless use of timers across multiple user devices on a LAN. A system may include a first user device, communicatively coupled to the LAN, having at least one first tuner and a first hardware processor configured for facilitating a first timer manager. A second user device communicatively coupled to the LAN may include at least one second tuner and a second hardware processor configured for facilitating a second timer manager. Each of the first timer manager and the second timer manager may be configured to populate a universal timer schedule that identifies at least one of a future availability and a future use for each of the at least one first tuner and the at least one second tuner. The universal timer schedule is populated based upon a request type, such as an auto-tune, PPV, original content, re-run, and a Joey request type.

20 Claims, 7 Drawing Sheets

(51) Int. Cl.

| | |
|---|---|
| ***H04N 21/426*** | (2011.01) |
| ***H04N 21/438*** | (2011.01) |
| ***H04N 21/472*** | (2011.01) |

(56) References Cited

U.S. PATENT DOCUMENTS

| | | | | |
|---|---|---|---|---|
| 11,197,049 | B1 | 12/2021 | Yang | |
| 2005/0108769 | A1* | 5/2005 | Arnold | H04N 21/6543 725/115 |
| 2006/0161635 | A1 | 7/2006 | Lamkin et al. | |
| 2008/0059884 | A1* | 3/2008 | Ellis | H04N 21/4334 715/721 |
| 2008/0155618 | A1* | 6/2008 | Grady | H04N 21/4821 348/E7.071 |
| 2008/0232312 | A1 | 9/2008 | Roh et al. | |
| 2008/0273856 | A1* | 11/2008 | Bumgardner | H04N 21/4334 386/292 |
| 2008/0282312 | A1* | 11/2008 | Blinnikka | H04N 5/765 386/E5.002 |
| 2009/0210533 | A1* | 8/2009 | Verhaegh | H04N 7/17318 725/118 |
| 2014/0281489 | A1 | 9/2014 | Peterka et al. | |
| 2015/0052568 | A1* | 2/2015 | Glennon | H04N 21/4147 725/100 |
| 2015/0195478 | A1* | 7/2015 | Hieb | H04H 40/90 348/731 |
| 2019/0208260 | A1* | 7/2019 | Gratton | H04N 21/4334 |

OTHER PUBLICATIONS

U.S. Appl. No. 16/885,972, Non-Final Office Action Response & Terminal disclaimer, dated Jul. 21, 2021.

U.S. Appl. No. 16/885,972, Non-Final Office Action, dated Apr. 21, 2021.

U.S. Appl. No. 16/885,972, Notice of Allowance, dated Aug. 10, 2021.

U.S. Appl. No. 16/886,190, filed May 28, 2020.

U.S. Appl. No. 16/886,190, Non-final Office Action Response, dated May 20, 2021.

U.S. Appl. No. 16/886,190, Non-final Office Action, dated Feb. 4, 2021.

U.S. Appl. No. 17/470,086, CON Application filed, dated Sep. 9, 2021.

U.S. Appl. No. 16/886,073, filed, May 28, 2020.

U.S. Appl. No. 16/886,073, Non-Final Office Action, dated Mar. 24, 2021.

U.S. Appl. No. 16/886,073, Notice of Allowance, dated Jun. 14, 2021.

U.S. Appl. No. 16/886,073, Response to Non-Final Office Action, dated May 20, 2021.

U.S. Appl. No. 16/886,190, Notice of Allowance, dated Sep. 7, 2021.

U.S. Appl. No. 17/470,086, filed, Sep. 9, 2021.

U.S. Appl. No. 17/470,086, Non-Final Office Action, dated Jun. 28, 2022.

U.S. Appl. No. 17/470,086, Notice of Allowance, dated Jul. 15, 2022.

U.S. Appl. No. 17/470,086, Response to Non-Final Office Action, dated Jun. 28, 2022.

U.S. Appl. No. 17/517,218, Non-Final Office Action, dated Aug. 9, 2022.

U.S. Appl. No. 17/517,218, Response to Non-Final Office Action, dated Nov. 8, 2022.

U.S. Appl. No. 17/517,218, Final Office Action, Dec. 1, 2022.

U.S. Appl. No. 17/517,218, Pre-Appeal Brief Request for Review, Dec. 22, 2022.

U.S. Appl. No. 17/517,218, Appeal Brief, Apr. 14, 2023.

U.S. Appl. No. 17/517,218,Pre-Appeal Brief Request Decision, Jan. 18, 2023.

U.S. Appl. No. 17/517,218, filed Nov. 2, 2021.

U.S. Appl. No. 17/517,218, Reply Brief, Jul. 13, 2023.

O'Reilly, Chapter 4. Browsing for Services, downloaded from the Internet on Jul. 10, 2023 at https://www.oreilly.com/library/view/zero-configuration-networking/0596101007/ch04.html.

Steinberg et al. "Zero Configuration Networking: The Definitive Guide" https://www.oreilly.com/library/view/zero-configuration-networking/0596101007/ch01.html (Year: 2006).

U.S. Appl. No. 17/517,218,Examiners Answer, Jun. 5, 2023.

Wikipedia, Service (systems architecture) downloaded from the Internet on Jun. 5, 2023 at https://en.wikipedia.org/w/Index.php?title=Service_(systems_architecture)&oldid= 1151084414.

U.S. Appl. No. 17/517,218, PTAB Decision, Jul. 1, 2024.

U.S. Appl. No. 17/517,218, Notice of Allowance, Sep. 18, 2024.

* cited by examiner

SEAMLESS TIMERS

CROSS REFERENCE TO RELATED APPLICATIONS

The present application claims priority to and is a Continuation application of U.S. patent application Ser. No. 16/886,190, filed on May 28, 2020, in the name of inventors Jason Carlson, John Huynh, Yunfeng Yang, Seth Byerley, Gowtham Ramkumar, and Mark Sokald, entitled "DEVICES, SYSTEMS AND PROCESSES FOR FACILITATING SEAMLESS USE OF TIMERS ACROSS MULTIPLE DEVICES WITHIN A LOCAL AREA NETWORK," the entire contents of which are incorporated herein by reference.

TECHNICAL FIELD

The technology described herein generally relates to devices, systems, and processes for facilitating use of timers for facilitating the receiving of digital content. The technology described herein also generally relates to the use of multiple timers, spread across multiple devices interconnected across a local area network ("LAN") and the use of such timers for activation of given tuners provided by the multiple devices interconnected across a LAN. The technology described herein also generally relates to the allocation of scarce resources, such as timers, across a local area network to facilitate the timely tuning of tuners to given content streams wherein, absent such allocation of resources, tuning to certain content streams may not be achievable.

BACKGROUND

Today, users commonly use content receiving devices, such as cable set top boxes, satellite set top boxes, streaming devices, such as those provided by ROKU, AMAZON, and others, and other devices to receive various forms of content. Herein and for purposes of efficient description only, such receiving devices are identified as each being an "STB". STBs may receive various forms of content, including analog content and/or digitally encoded content. Such content may include video programs, television shows, movies, video clips, and the like, audio programs, and other forms of content. Often multiple users are associated together, such as members of a family, or other localized group of individuals. Such associations of user are each referred to herein as being within a "household." Users in such households often desire to receive, often at a same time, given instances of content, such as a specific episode of a television show, a movie, or other content; such specific instances of content each being identifiable herein by a "title." Often, an indication of interest in receiving such content, for then or later consumption, occurs before a time at which such content is available for reception.

Yet and despite the association of two or more users in a household, each user of a household commonly is required, with respect to their STB(s), to individually set timers to, in the future, receive and process separate instances of a given title using those resources provided by their STB. For example, a first user in a given household desiring to receive an instance of a title is commonly required to dedicate one or more resources in their STB to the reception, demodulation, decrypting, and otherwise processing of that content. For content to be received in the future, such dedication commonly occurs by specifying a timer. Such future instance may occur at any time other than a present time. Such desire later reception may occur on a repeat basis, as desired by a given user for a given title. For example, a title may include multiple episodes, receivable at different times. A user may desire to receive each such episode and may individually set one or more timers, on a given STB, to later receive such content. The received content may be then watched/consumed, while being received, or saved in a DVR or otherwise for later viewing/consumption.

When a timer is desired to be set, if one or more of needed resources on a given STB are not available for future allocation of such timer, the timer may not be set and future reception and access to the content may not be achievable. Or, the timer may be set by overriding an existing timer. This situation may occur even if other STBs within a given household have one or more needed resources for setting a desired timer.

As used herein, STB resources are commonly identified herein as each being, separately and/or in combination, a "tuner," however, it is to be appreciated that such resources may be separately identifiable and/or useful to a given STB. Accordingly, as used herein a "tuner" refers to a hardware, software and/or combination of hardware and software resource that is provided within and/or accessible by a given user with respect to a given one or more STBs. A "tuner" resource may be accessible using an Internet or other server, or otherwise.

It is to be appreciated, however, that such tuners are often not available to a given user to receive a desired title, at a given future time. Thus, a timer, which instructs a given STB to allocate a tuner (and any other needed resources) to receive the title, may not be set. This scenario may arise even when multiple tuners are located within a household, and all of such tuners are not, at that given future time, dedicated for such future use by one or more timers.

To overcome such constraints, one approach content providers, such as cable and satellite TV companies, use is to provide additional tuners in a given STB, thereby facilitating the setting of additional timers. Some STBs include over a dozen tuners, such as the DISH Network HOPPER 3 STB, which includes 16 separate tuners. Thus, often multiple tuners are provided so that multiple timers may be executed at any given time. Yet, such tuners are not commonly used at the same time, and undue waste and expense often occurs because a user of another STB within a household is not able to access tuners, or set timers for future use thereof, in other STBs within a given household. Accordingly, devices, systems, and methods for addressing these and other concerns are needed.

SUMMARY

The various embodiments of the present disclosure relate in general to devices, systems, and processes for facilitating seamless use of timers across multiple devices within a local area network. In accordance with at least one embodiment of the present disclosure, a system may include a first user device communicatively coupled to a local area network (LAN). The first user device may include at least one first tuner and a first hardware processor configured to execute first, non-transient, computer instructions for facilitating a first timer manager. The system may include a second user device communicatively coupled to the LAN and including at least one second tuner and a second hardware processor configured to execute second, non-transient, computer instructions for facilitating a second timer manager. For at least one embodiment, each of the first timer manager and the second timer manager may be further configured to populate a universal timer schedule. The universal timer schedule may identify at least one of a future availability and a future use for each of the at least one first tuner and the at least one second tuner.

For at least one embodiment, the universal timer schedule is populated based upon a request type. For at least one embodiment, wherein the request type is a Joey request type, and where at least one of the at least one first tuner and the at least one second tuner may be configured as a linked main tuner; an available linked main tuner may be scheduled for future use by a Joey. For at least one embodiment, the request type may be one of an auto-tune request type, a pay-per-view (PPV) request type, an original content request type, and a re-run request type; wherein the auto-tune request type has a higher separate priority than the PPV request type. For at least one embodiment, the PPV request type has a higher priority than the original content request type. For at least one embodiment, the original content request type has a higher separate priority than the re-run request type.

For at least one embodiment, the system may include a third user device communicatively coupled to the LAN and having at least one third tuner; and a third hardware processor configured to execute third, non-transient, computer instructions for facilitating a third timer manager. The third timer manager may be configured to further populate the universal timer schedule by identifying at least one of a future availability and a future use for the at least one third tuner.

For at least one embodiment, the universal timer schedule may identify a priority for each scheduled future use of each of the at least one first tuner, the at least one second tuner, and the at least one third tuner.

For at least one embodiment, the first user device may include a first storage module that include a first user device schedule identifying any scheduled first uses for each of the at least one first tuners. The second user device may include a second storage module that includes a second user device schedule identifying any scheduled second uses for each of the at least one second tuners. The contents of each of the first user device schedule and the second user device schedule may be used to populate the universal timer schedule.

For at least one embodiment, the first timer manager and the second timer manager may cooperatively process a new timer request in view of the scheduled first uses, the scheduled second uses, and a priority of the new timer request. The new timer request may identify a desired future use of a tuner selected from at least one of the at least one of the first tuner and the at least one second tuner.

For at least one embodiment, the priority may be one of an auto-tune, a pay-per-view, an original content, and a rerun.

For at least one embodiment, when the new timer request is received from a Joey, the first user device may be further configured to determine whether a linked main tuner will be available.

For at least one embodiment, the first user device may include a first storage module configured to store user preference information in a user database. The first computer instructions may instruct the first timer manager to populate the universal timer schedule in view of the user preference information.

In accordance with at least one embodiment of the present disclosure a process, for seamless use of timer provided by multiple user devices within a local area network, may include operations of maintaining, by a first user device, a first user device schedule—the first user device including a first tuner. The operations may also include receiving, by the first user device and from a second user device, a second user device schedule—the second user device including a second tuner. The operations may also include populating, by the first user device, a universal timer schedule based on the first user device schedule and the second user device schedule. The universal timer schedule may identify one or more future scheduled uses of each of the first tuner and the second tuner.

For at least one embodiment, the second universal timer schedule may be populated by the second user device.

For at least one embodiment, the process may include prioritizing a new schedule request based on a request type. The request type may be selected from a highest to lowest ranked ordering having at least two or more of an auto-tune request, a PPV request, an original content request, a rerun request, and a Joey request. For at least one embodiment, the process may include second prioritizing the new request based on a user identifier. A first user identifier may be associated with the first user device and a second user identifier may be associated with the second user device. The process may further include giving the new request a highest priority when the new request is from the second user and for a future use of the second tuner.

In accordance with at least one embodiment of the present disclosure, a user device, configured for use in facilitating seamless timer use across multiple devices within a local area network, may include a first receiver module including a first tuner. The user device may also include a hardware processor configured to execute non-transient computer instructions for facilitating a timer manager; a storage module for storing a timer schedule; and an interface module configured to communicatively couple the user device with a second user device over a local area network (LAN). For at least one embodiment, the second user device may include a second tuner. For at least one embodiment, the timer manger facilitates operations including populating a universal timer schedule identifying any scheduled uses of each of the first tuner and the second tuner and establishing a session between the first user device and the second user device, via the LAN. During the session, scheduling of a future use of each of the first tuner and the second tuner may be prioritized based on at least a request type. For at least one embodiment, the request types may include at least one of an auto-tune request, a pay-per-view request, an original content request, a re-run request, and a Joey request.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and processes for facilitating seamless use of timers across multiple devices within a local area network.

Figure 1:
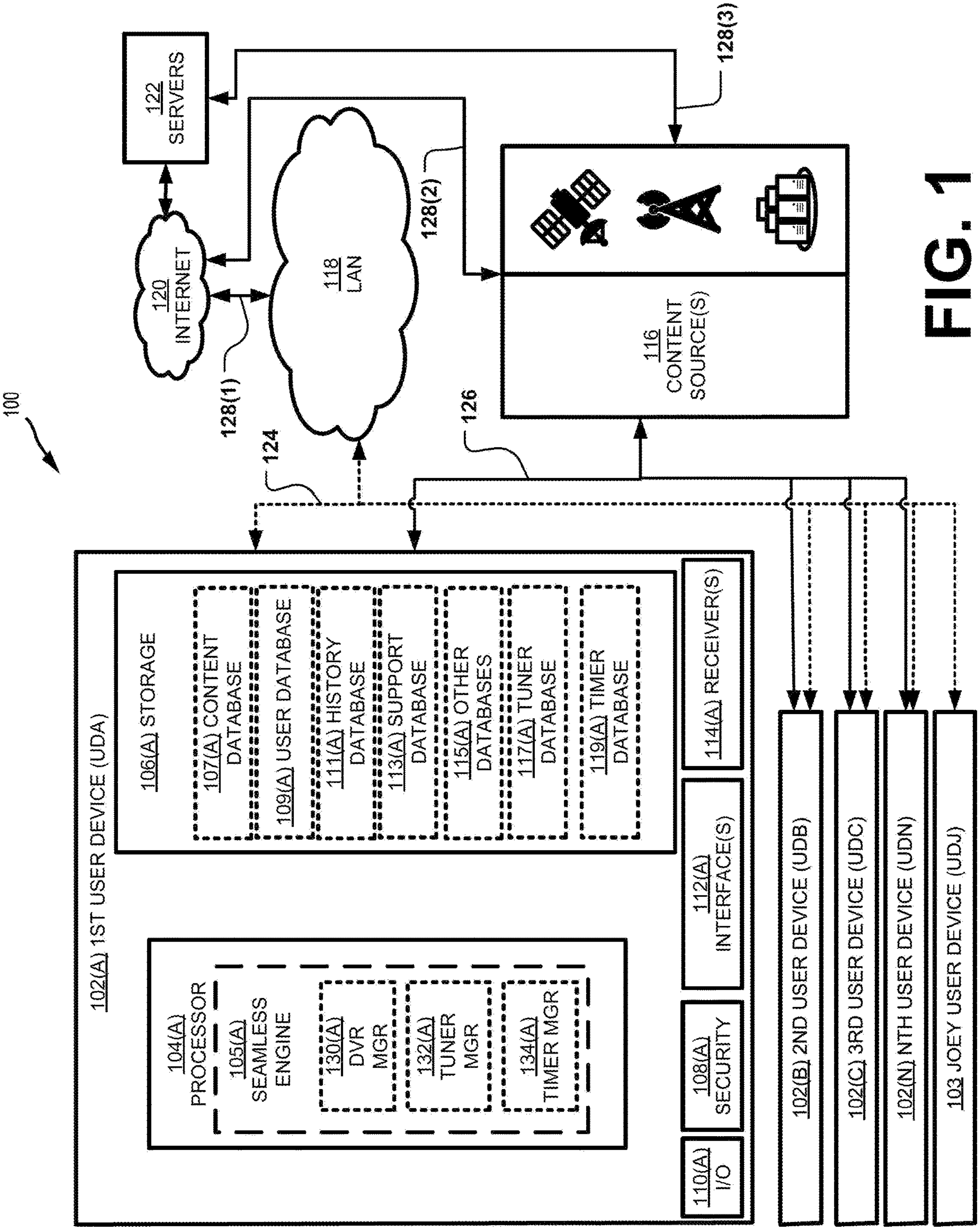
FIG. 1 is a schematic diagram of a system configured, in accordance with at least one embodiment of the present disclosure, to facilitate seamless use of timers across multiple devices within a local area network.

As shown in FIG. 1, and as briefly discussed above, each user of a household commonly is associated with one or more user devices, such as user devices 102(A), 102(B) and 102(N) (herein, the "(A)," "(B)," and "(N)" indicate unique user devices). Each of the user devices may be the same type of device or different. Non-limiting examples of user devices 102 include cable/satellite set-top boxes, smart televisions, streaming devices, laptop and desktop computers, table computing devices, smartphones, gaming consoles, and otherwise. Each user device 102 commonly includes a processor module 104, a storage module 106, a security module 108, an input/output ("I/O") module 110, one or more interface modules 112, such as a local area network ("LAN") interface, and one or more receiver modules 114. Each of these components are further discussed below. Additional components may be used in any given user device 102 and a component may be provided as integrated into a given user device 102, directly coupled to a given user device 102, indirectly coupled to a given user device 102, or otherwise communicatively and/or operationally coupled to a given user device 102. One or more less capable devices (which are referred to herein as "Joeys") 103 may also be used in a given system 100. For at least one embodiment, a Joey 103 differs, at a minimum, from a user device 102 by not having one or more receivers 114. Accordingly, a Joey 103 is typically configured to utilize a receiver 114 provided in a user device 102 for reception and signal processing of content provided by a content source 116.

Each user device 102 provides a user thereof with access to a digital storage device, such as a DVR. The DVR may be provided by the corresponding storage module 106, and controlled by and/or accessed using one or more other user device components, such as the I/O module 110. For at least one embodiment, a user device 102 may be configured to facilitate one or more Seamless DVR features and functions. For a Joey 103, DVR functions may be provided by, and accessible using, a linked main/master user device 102.

As further shown in FIG. 1, the various user devices 102(A)-102(N) may be communicatively coupled to one or more content sources 116 by one or more receiver links 126. Non-limiting examples of such content sources 116 include satellite distribution services, such as those provided by DIRECTV, DISH and others, cable system providers, such as those provided by COX, XFINITY, and others, terrestrial content broadcasters, such as those provided by local television stations within one or more defined areas, streaming/on-line content system providers, such as NETFLIX, SLING TV, HULU, YOUTUBE, DISNEY+, HBO NOW, other over the top sources, and other sources. It is to be appreciated that a given user device 102 may be configured to receive content on a demand, request, scheduled, or other basis. A given user device 102 may be configured to receive content from multiple content sources 116 and store one or more instances of such content in the storage module 106. Such content may be identified by a source, title and/or program ID and may require use of certain encryption and/or digital rights management ("DRM") keys and/or profiles to decrypt, present, and otherwise access.

The receiver links 126 may use any form and/or combination of any known and/or later arising wired, wireless and/or combinations thereof communications technologies; non-limiting examples include WIFI, Ethernet, coaxial cables, CAT 5/6 cabling, BLUETOOTH, fiber optic cables, and others. A household may be configured to provide a single content source node, such as and not by limitation, a satellite television antenna and receiver, by which user devices 102 within the household may be coupled to one or more content sources. Such content source nodes are well known in the art. Other examples of content source nodes may include routers, gateways, and other devices.

As further shown in FIG. 1, each of the user devices 102 and the Joeys 103 may be communicatively coupled to a LAN 118 by one or more internal links 124. User devices 102 and Joeys 103 may also, and/or alternatively, be communicatively coupled used MOCA (multimedia over coax), or other communications and/or networking technologies. Interconnections between combinations of two or more user devices 102, Joeys 103 and/or other devices, such as Internet servers 122, are collectively identified herein as arising over a LAN 118.

For other embodiments, the LAN 118 may be configured for use with two or more households, as may arise in a multi-unit dwelling. When two or more household are communicatively coupled using the LAN 118, as desired, appropriate firewalls and other logical and/or physical separations may be provided between such households. The internal links 124 may use any desired known and/or later arising wired, wireless and/or combinations thereof communications and network technologies; non-limiting examples include WIFI, Ethernet, coaxial cables, CAT 5/6 cabling, BLUETOOTH, fiber optic cables, and others.

As discussed further below, the LAN 118 provides a communications pathway by which the various user devices 102 and/or Joeys 103 within a household, at any given time communicate. The LAN 118 may have a name or SSID associated with it. Such name may hidden or publicly detected, identified. Using the LAN 118, one or more common universal directories may be populated. Such common universal directories may include a directory of recorded content, as taught by Seamless DVRs, tuners available or in use, as taught by Seamless Tuners, and timers schedulable and/or available for scheduling as taught herein, and otherwise. A universal directory may identify various component and/or elements of the system 100, as provided by two or more user devices 102 and/or Joeys 103, connected thereto and/or as accessible, at any given time, within a given household.

A universal directory may be seamlessly accessible by one or more of the user devices 102 and/or Joeys 103, even when the universal directory is not directly stored using a storage module 106 provided by that given user device 102 or accessed by a Joey 103. That is, for at least one embodiment, a universal directory may be populated by and accessible from any of one or more user devices 102 and/or Joeys 103 then communicatively coupled to a given LAN 118, where each such user device 102 and/or Joey 103 is configured to facilitate one or more of Seamless DVR, Seamless Tuner and/or Seamless Timer features and functions, where Seamless Timer features and functions include, but are not limited to such features and functions described in the present disclosure.

As discussed above and for at least one embodiment, access to the LAN 118 may be limited to members (user devices 102 and/or Joeys 103) associated with a given household. Such access may be limited using any known or later arising network access control technologies. Non-limiting examples of such access control technologies include the use of passwords, MAC address listings, and others. For another embodiment, access to the LAN 118 may be open to user devices not associated with a given household. It is to be appreciated that when user devices are external to a given household, additional and/or different DRM protocols, tuning protocols, timer protocols, or the like may be used and/or required with respect to all and/or some of the information identified on a universal directory.

For at least one embodiment, the internal links 124 may use any currently known or later arising communications and/or networking technologies. For at least one embodiment, the internal links 124 may be established using peer-to-peer communications technologies. For at least one embodiment, the internal links 124 may use a hub and spoke configuration, with a router of other device facilitating formation of the LAN 118.

For at least one embodiment, the LAN 118 may be self-forming. Self-formation of the LAN 118 may arise when a user device 102 and/or Joey 103 known to be associated with a member/user of a household (or other approved collection of user and their associated user devices), communicatively enters into, by change of physical location, powering on, turning of a networking interface element or otherwise, an area in which a LAN 118 is formed or is to be formed. For example, upon entry of a second user device 102(B) into an area, such as a house, containing a first user device 102(A), the second user device 102(B) may announce its presence to a wireless router, such as a WIFI router, to which the first user device 102(A) is already communicatively coupled. Each of the first user device 102(A) and the second user device 102(B), and/or any other user devices then connected to the LAN 118 and desiring to participate in a universal directory service facilitated over such LAN 118, may be configured to initiate a discovery and LAN formation process between the first user device 102(A), the second user device 102(B) and any other user devices 102(N). Such LAN 118, as discussed below, may be used to facilitate one or more of Seamless DVR, Seamless Timer and/or Seamless tuner features and functions.

Similarly, a third user device 102(C) may communicatively enter an area wherein the LAN 118 already exists between the first user device 102(A) and the second user device 102(B). Upon the third user device 102(C) announcing its presence, one or more of the first and/or second user devices 102(A)/(B), if not both, may accept entry of the third user device 102(C) onto the LAN 118. Such LAN entry may provide for a limited entry privileges, full entry privileges, or otherwise to the third user device 102(C).

For example, entry privileges may be used to determine which tuners a given user device 102, such as the third user device 102(C) may be permitted to access, which tuners, if not all, provided by other user devices 102 are identifiable to the third user device 102(C), which of the third user device's tuners are discoverable to other user devices 102 and/or Joeys 103, which of any other user devices 102 and/or Joeys 103 may access tuners provided by the third user device 102(C), and otherwise. It is to be appreciated, that such privileges may be provided and/or not provided in view of one or more considerations including, but not limited to, digital rights management ("DRM") restrictions, parental control settings, and otherwise. For at least one embodiment, each user device 102 and Joey 103 participating in the LAN 118, may be populated with a same, unique, or some permutation thereof, universal directory of tuners accessible via the LAN 118. For at least one embodiment, a first universal directory available to a first user device 102(A), may vary from a second universal directory available to a second user device 102(B), and the like.

As further shown in FIG. 1 and for at least one embodiment, the LAN 118, content sources 116 and servers 122 may be communicatively coupled, via the Internet 120, directly, via or other wide area networks and/or communications technologies, services and/or systems, or otherwise, by one or more external links, such as external links 128(1)-128(3). It is to be appreciated that the Internet 120 may provide access by one or more of the user devices 102, Joeys 103, content sources 116, LAN 118, and the like to one or more servers 122. Such servers 122 may be used in providing access to a given tuner, authenticating access to a given tuner, or otherwise. The external links 128 may use any known or later arising communications and/or networking technologies. For at least one embodiment, one or more external net links may be established using common cellular communications technologies including, but not limited to, 3G/4G/5G technologies. For at least one embodiment, one or more external links 128 may be established using any desired communications technology of which non-limiting examples include Ethernet, the Internet, private networks, public networks, the plain old telephone service (POTS), microwave links, fiber-optics, wireless, wired, cellular, other networking communications technologies, and/or combinations thereof.

Processor Module (104)

Referring again to FIG. 1, a user device 102 may include one or more processor modules 104 configured to provide computer implemented software and hardware engines including, for example and not by limitation, a seamless engine 105. For purposes of facilitating Seamless Timer, the processor module 104 may include a seamless engine 105. The seamless engine 105 may be further configured to include one or more second processing modules including, but not limited to, a DVR manager 130, a tuner manager 132, and a timer manager 134. For at least one embodiment, such managers may be subordinate to the seamless engine 105. For another embodiment, one or more of such managers may be used independently and/or in conjunction with the seamless engine 105. Other computer implemented engines and/or managers may be provided for in other embodiments.

The processor module 104 may be configured to provide any desired data and/or signal processing capabilities. For at least one embodiment, the processor module 104 may have access to one or more non-transitory processor readable instructions, including instructions for executing one or more applications, engines, and/or processes configured to instruct the processor to perform computer executable operations (hereafter, "computer instructions"). The processor module 104 may use any known or later arising processor capable of providing and/or supporting the features and functions of a given user device as needed for any given intended use thereof and in accordance with one or more of the various embodiments of the present disclosure.

For at least one non-limiting embodiment, the processor module 104 may be configured as and/or has the capabilities of a 32-bit or 64-bit, multi-core ARM based processor. For at least one embodiment, the processor module 104 may use, in whole or in part, one or more backend systems, such as server systems or otherwise. Computer instructions may include firmware and software instructions, and associated data for use in operating a given user device 102, as executed by the processor module 104. Such computer instructions provide computer executable operations that facilitate one or more features or functions of a given user device 102 and in accordance with one or more embodiments of the present disclosure.

Seamless Engine (105)

For at least one embodiment, the processor module 104 may be configured to implement computer instructions for configuring a user device 102 to function as a seamless tuner. To facilitate such functionality, computer instructions for facilitating a seamless engine 105 may be executed by the processor module 104. For at least one embodiment, the seamless engine 105 may be executed by each processor module 104 for those user devices 102 participating on a given LAN 118. The seamless engine 105 may be a combination of a hardware processor and computer instructions. In other embodiments, the seamless engine 105 may be implemented by a dedicated or separate processing component. The seamless engine 105 may be configured to provide a given user device 102 with capabilities of designating, defining, generating, managing, manipulating, accessing, and/or providing seamless timer features and functions to, with and/or between two or more user devices 102, and/or Joeys 103, on a LAN 118.

The seamless engine 105 may be configured to permit certain known, discoverable, unknown, or other user devices 102 and/or Joeys 103 to join in a given LAN 118 such that tuners on such user devices 102 may be seamlessly accessed by and between the various user devices 102 and/or Joeys 103 on the LAN 118. As discussed above, for at least one embodiment, access to the LAN 118 may be limited to members of a household and/or other authorized users.

For at least one embodiment, the seamless engine 105 may be configured to facilitate the seamless reserving, via one or more timers, of tuners on a LAN 118, where such tuners are provided by one or more user devices 102, such as a first user device 102(A). For at least one embodiment, a given user device 102 may be designated as a "master" user device. One or more other user devices 102 on a given LAN 118, may be each designated as a "remote" user devices, such as a second user device 102(B). Tuners, DVRs, and other components provided by a given user device 102 may correspondingly also be so designated. The designation of a user device 102 as a given master or remote may vary over time. For at least one embodiment, a LAN 118 commonly includes at least one master user device 102 and at least one of a remote user device 102. The LAN 118 may also include one or more Joeys 103.

For at least one embodiment, the seamless engine 105 may be configured to facilitate varying roles. That is, a role designated by a given user device 102 may vary over time. Further, such roles may coexist. For at least one embodiment, two or more user devices 102, on a given LAN 118, may be designated as a "master" and/or a "remote". For at least one embodiment, Joeys 103 are not designated as master or remote user devices, and instead fall within their own category of devices that are dependent on a master or a remote user device with receiver, tuner, and other content processing operation capabilities.

For at least one embodiment, the seamless engine 105 may be configured to facilitate a given role of a user device 102 with respect to a given tuner as being associated with a given "session." More specifically and for at least one embodiment, a session is a process, executed by one or more user devices 102, wherein a given content is received from a content source 116. The session may also include one or more content processing operations which convert such content into a final or intermediate form for presentation to a human user (herein, "content processing operations") Non-limiting examples of such content processing operations include demodulation, amplification, decryption, and otherwise.

It is to be appreciated that for at least one embodiment, the seamless engine 105 may be configured to facilitate multiple, simultaneous sessions with respect to multiple content. It is to be appreciated that a tuner is commonly used for each session, but, for one or more embodiments, a single tuner may facilitate multiple sessions.

Further and for at least one embodiment, the seamless engine 105 may be configured to facilitate synchronization between two or more sessions, as desired. For at least one embodiment, a receiving of a given content by a first user device 102(A) may be transferred to another user, second user device 102(B), as desired. Such transfers may be synchronized such that presentation of a given content is minimally interrupted, if at all, as determined from a user's perspective, where a minimal interruption is an interruption in a presentation of a given content for less than two (2) seconds. For another embodiment, such synchronization may not be facilitated by a seamless engine 105

For at least one embodiment, the seamless engine 105 may be configured to facilitate user devices on the LAN 118 being able to schedule for later use tuners of another user device 102 on the LAN 118 to receive and/or perform one or more content processing operations.

For example, a first user device 102(A) may have capability to decrypt a given content stream, while a second user device 102(B) currently provides such desired capability. Accordingly and for at least one embodiment, the first user device 102(A) may utilize, over the LAN 118, the content decryption capabilities of the second user device 102(B) on an as needed, as desired, as permitted, or other basis.

For at least one embodiment, the seamless engine 105 may execute on a user device 102 configured to operate as a hub and spoke which facilitates communications between a first user device 102(A) and one or more second user devices 102(B)-102(N) and/or Joeys 103 over a then arising LAN 118. More specifically, one of the user devices 102 may be configured to operate its seamless engine 105 in the master mode, while other user devices 102 on the LAN 118 may be configured to operate their seamless engine 105 in one of a subordinate mode, such as a remote mode or a Joey mode (for Joeys 103). In other embodiments, each seamless engine 105 may be configured to operate, independently, in a master mode, with any conflicts arising between respective user devices 102 being resolved in view of one or more conflict roles and/or algorithms executed by the seamless engine 105 on each such user device 102.

For at least one embodiment, a seamless engine 105 may be configured to identify available and acceptable user devices 102 and/or Joeys 103 for coupling together on a formed or to be formed LAN 118. Such identification may be based upon relationship information stored in a storage device 112, such as an account identifier, where, for example and not by limitation, each user device 102 and/or Joey 103 configured for use on a given LAN 118 is associated with a household identifier. User devices 102 and/or Joeys 103 not so associated with a given household identifier, such as those provided in another unit of a multi-unit dwelling, may not be configurable for use on a given LAN 118 for a given household. For at least one embodiment, household relationship information may be provided to each user device 102 and/or Joey 103 using any known or later arising communications technologies. For at least one embodiment, one or more smart cards, processes, modules, or the like for the security module 108, in a given user device 102 and/or Joey 103, may be configured to include such household identifier.

For at least one embodiment, a seamless engine 105 may be configured to invite and/or accept other user devices 102 and/or Joeys 103 onto a given LAN 118, for accessing tuners provided by one or more other user devices 102 on the LAN 118 and based upon one or more criteria and/or corresponding settings. One non-limiting example of a criteria may include whether a given user device 102 and/or Joey 103 is permitted to access a tuner to receive content in one or more rating and/or parental control classifications, such as PG-13, R, or otherwise. Another non-limiting example of a criteria may include whether a given user device 102 and/or Joey 103 is permitted to access a receiver within certain time periods, such as late night, or otherwise. Another non-limiting example of a criteria may include whether a given user device 102 and/or Joey 103 is permitted to access tuner in order to access content having a limited use, payment, or other criteria.

For at least one embodiment, the seamless engine 105 may be configured to facilitate control of access to and scheduling of tuners on user devices 102 on a LAN 118 by use of other forms of access criteria such as passcodes, security keys, or other information. For at least one embodiment, a seamless engine 105 may be configured to accept any user device 102 and/or Joey 103 within range thereof and/or satisfying/over-coming one or more access criteria.

For at least one embodiment, the seamless engine 105 may be configured to facilitate scheduling, via timers, of later formations of multiple seamless tuner sessions between multiple user devices 102 and/or a user device 102 and a Joey 103, on a given LAN 118. For example, a timer may be set which, per a first seamless tuner session, may permit access to a tuner on a first user device 102(A) by a user thereof, while a second seamless tuner session may permit access by a second user, via a second user device 102(B) and/or a Joey 103, to a tuner provided by the first user device 102(A).

For at least one embodiment, the seamless engine 105 may be configured to facilitate scheduling of private, seamless tuner sessions. For a private session, participation in the session may be limited to a selected group of user devices 102 and/or Joeys 103. That is, content provided by use of a given tuner may be multi-cast to one or more user devices 102 and/or Joeys 103. For at least one embodiment, a private session identifier may not be discoverable to other user devices 102 and/or Joeys 103 on the LAN 118 absent knowledge of the same and the providing of one or more credential, passcodes, or the like.

For at least one embodiment, the seamless engine 105 may be configured to facilitate scheduling of public, seamless tuner sessions. For a public session, participation in the seamless tuner session may be unlimited and any user device 102 and/or Joey 103 having permission to join the LAN 118 may join in the session and receive the content via the designated tuner. For at least one embodiment, permission to join the LAN 118 may not be required. Accordingly, it is to be appreciated that a seamless tuner session may occur at any desired level of openness ranging from private to public and may, in effect, function as a broadcast session.

For at least one embodiment, the seamless engine 105 may be configured to facilitate scheduling of a seamless tuner session by designating a given user device 102 as a master for providing information available to form the session between two or more user devices 102 and/or with a Joey 103 and for reconfiguring other user devices 102, as needed, to facilitate such other user devices 102 and/or Joeys 103 joining and/or participating in one or more sessions.

For at least one embodiment, the seamless engine 105 may be configured to facilitate scheduling of seamless tuner session formation and/or reconfiguration, by each user device 102 and Joey 103 configuring itself to periodically output one more “available” signals. The available signals may be used to identify a given user device 102 or Joey 103 as available on a given LAN 118 and as being available to participate in a given seamless tuner session. An available signal may designate a given session, a to be formed session, no session, or otherwise.

The seamless engine 105 may also be configured to facilitate designation of a given user device 102 as being (in)capable to operate, with respect to one or more sessions, in a master mode or a remote mode. For at least one embodiment and as defined herein, Joeys 103 are not configured to operate in a master mode or a remote mode. Such designations may vary over time and as scheduled and/or unscheduled use of a given user device 102 so varies. It is to be appreciated that a given user device 102 may not have the same capabilities as another user device, at any given time, or otherwise. For example, a first user device 102 may be capable of receiving and/or performing one or more content processing operations with respect to 4K video signals while another user device 102 is capable of receiving and/or performing one or more content processing operations with respect to video signals having a resolution only up to 1080p. The seamless engine 105 may be configured to facilitate such designation and, in conjunction with other user devices 102 on a given LAN 118, schedule a future allocation of resources across the LAN 118 to facilitate one or more, if not all, the desired sessions—as subject to any and/or each user device, LAN, and other system constraints.

For at least one embodiment, the seamless engine 105 may be configured to facilitate scheduling of a given seamless tuner session by recognizing capabilities of other user devices 102 likely participating in the given future session, and/or on a given LAN 118, at a given future time. The seamless engine 105 may be configured to facilitate adaptations to sessions as based upon then arising system 100 capabilities. For example, the entry or exit of one or more user devices 102 and/or Joeys 103 from the LAN 118 may require a real-time adaptation in how scheduled sessions are executed, if executable.

DVR Manager (130)

For at least one embodiment, a seamless engine 105 may be configured to execute additional operations facilitating use of a DVR manager 130. The DVR manager 130 may be executed in conjunction with and/or in support of a seamless engine 105 including, but not limited to, those seamless engines taught by Seamless DVR.

Tuner Manager (132)

For at least one embodiment, a seamless engine 105 may be configured to execute operations for facilitating seamless use of tuners—as provided by multiple user devices 102 on a LAN 118. For at least one embodiment, the tuner manager 132 may be configured to perform one or more of the operations described in Seamless Tuners.

Timer Manger (134)

For at least one embodiment, a seamless engine 105 may be configured to execute additional operations facilitating use of a timer manager 134. The timer manager 134 may be executed in conjunction with and/or in support of a seamless engine 105 to schedule one or more timers identifying a future use of one or more tuners and/or other content processing components, as provided in one or more user devices 102 and as further described herein including, but not limited to, as described in conjunction with FIGS. 4-7 and in accordance with at least one embodiment of the present disclosure.

For at least one embodiment, a timer manager 134 may be configured to facilitate entry of a timer on a first user device 102(A) and populate such timer to all other user devices 102(B)-102(N) then connected to each other over a given LAN 118. It is to be appreciated that the population of timers across all user devices 102 provides robust timers, such that an inoperability of a given user device 102 does not necessarily result in a non-activation of a timer for a desired title.

For at least one embodiment, tuners available across multiple user devices 102 on the given LAN 118 may be allocated on an as needed basis. For example, a predetermined time prior to a given timer being activated, a determination may be made as to which tuner and/or other content processing components are available and a selection of a tuner and/or other content processing components for may be made to satisfy the given timer. For another embodiments, tuner and/or other content processing component selection may occur at the time of timer creation, or otherwise. For at least one embodiment, a notification of an ability of a system 100 to fulfill or not fulfill a given timer request may be provided to a user. Such notification may be made at any desired time including, but not limited to, at time of new timer entry, at a time of tuner and/or other component reallocation, or otherwise.

For at least one embodiment, each timer manager 134 may be configured to execute, as possible, each timer populated on a local copy of a universal timer schedule (as described further below in conjunction with FIGS. 3A and 3B), when a connection to another user device 102 on a given LAN 118 is interrupted or otherwise ceases to exist.

For at least one embodiment, an active timer is given a priority over any other timer, timer request, tuner request, or otherwise. An exception, however, may be made for at least one embodiment for emergency broadcast messages and the like.

Storage Module (106)

For at least one embodiment, a user device 102 may include one or more storage module(s) 106. Computer instructions, data sets and/or other information (collectively herein, "stored data") may be stored by such storage module(s) 106 and used by the processor 104 and/or other system hardware and/or software components to provide one or more features and/or capabilities of the various embodiments of the present disclosure. For example, the processor module 104 may be configured to execute, use, implement, modify, or otherwise process such stored data. It is to be appreciated that the storage module(s) 106 (each module and/or sub-division thereof a "storage component") may be configured using any known or later arising data storage technologies. In at least one embodiment, storage module(s) 106 may be configured using flash memory technologies, micro-SD card technology, as a solid-state drive, as a hard drive, as an array of storage devices, or otherwise. Storage module(s) 106 may be configured to have any desired data storage size, read/write speed, redundancy, or otherwise. A storage module 106 may be configured to provide temporary/transient and/or permanent/non-transient storage of stored data, as the case may be. Stored data may be encrypted prior to and/or at the time of storage, with decryption of such stored data occurring, as needed, for use by processing module, or otherwise.

Storage module(s) 106 may include one or more databases providing information, instructions and/or data for use in facilitating seamless timers, LAN formation and operation, and otherwise. For at least one embodiment, such databases may include one or more of a content database 107, a user database 109, a history database 111, a support database 113, an "other" database 115, a tuner database 117, and a timer database 119. Other databases may be used for other embodiments.

Content Database (107)

For at least one embodiment, a content database 107 may be configured to collect and provide access to content for use during one or more seamless DVR sessions. Such one or more seamless DVR sessions may be scheduled or unscheduled. Content may be group, partitioned, or otherwise associated for use with and/or during a seamless DVR session automatically, based on user input, or otherwise. Non-limiting examples of the content database 107 are further described in Seamless DVRs. As discussed above, a seamless DVR session may be specific to a given content, a given LAN, a given collection of user devices, arise at a given current or future time, or otherwise. For example, a seamless DVR session may be formed with respect to all content, where any user device participating in the seamless DVR session may access the content. For another embodiment, the content database may partition and/or identify content permissible to only those user devices meeting certain criteria. For at least one embodiment, the content database may be configured to categorize content based upon genre, rating, or other criteria.

Further, it is to be appreciated that seamless DVR sessions, as related to how content is stored, accessed or otherwise provided by a given user device 102, may be generalized and/or specified (to any level thereof or therebetween) to the extent that such content itself may be generalized and/or specified. For at least one embodiment, a seamless DVR session may be additionally, separately, and/or alternatively specific to a given group of user devices, such as user devices A, B and C. Such grouping of user devices with respect to a given seamless DVR session may, as desired, may be specific to a given LAN or otherwise. The content database 107 facilitates the storage of data related to seamless DVR sessions that the seamless DVR engine 105 may utilize to facilitate formation, use, reconfiguration and/or demolition of a seamless DVR session.

User Database (109)

For at least one embodiment, information pertaining to a user and/or a population of users may be provided by a user database 109. The storage module 106 may be configured to collect and provide data relating to one more users and/or their preferences. The user preferences may include any information that may be and/or is useful in supporting one or more seamless tuner sessions. Non-limiting examples of such user preferences may include types of content a user prefers. The breadth and scope of such types of information, and the degree of specificity and/or anonymity and/or generality associated therewith is not limited and may vary as desired with the providing, use, or otherwise of one or more seamless tuner sessions. Any source of information may be used in populating the user database 109. The user database 109 may be used by the seamless engine 105 of a first user device 102(A) in determining which tuner on a second user device 102(B) is accessible to a user of the first user device 102(A). For example, a user preference of sports related content being presented in 4K and not at lower resolutions, may result in a given seamless engine 105 providing a universal timer schedule 300 tailored to such user preferences by indicating tuners available to support such 4K content preferences.

For at least one embodiment, the user database 109 may be configured to provide information pertaining to capabilities of a given user device 102 and/or Joey 103. Such capabilities information may include information regarding peripheral devices coupled to the user device 102 or Joey 103, such as capabilities of a display device coupled to a given user device 102 or Joey 103. Such information may be useful in determining which tuners to schedule for a future use of a given seamless tuner session, in view of capabilities of a destination user device 102 or Joey 103. In view of such capabilities, content that exceeds capabilities of a given user peripheral device may not need to be scheduled to be received or otherwise processed. Such information may be informative in identifying tuners available to meet a user's preference and the scheduling thereof for future use, as reflected in one or more timers. Likewise, a tuner for use in processing content that is of a lesser quality (such as, standard definition content) from a first source may not be identified for a given session when a tuner, in another user device 102, supporting content of a higher quality (such as, high definition content) is available for scheduling at the desired future time. Other considerations may be used by a given user device's seamless engine 105, based upon information stored in the user database 109, in facilitating use of a seamless timer.

History Database (111)

For at least one embodiment, information pertaining to a history of seamless tuner sessions may be provided by a history database 111. The storage module 106 may be configured to collect and provide data relating to the use, construction of and deconstruction, as appropriate, of seamless tuner sessions by a given user device 102. Such data may be useful in facilitating the scheduling of future seamless tuner sessions (via one or more seamless timers), generating opportunities to monetize the promotion and/or advertising of content in conjunction with and/or in support or response to the use of seamless tuner sessions, and otherwise. The history database 111, for at least one embodiment, may include information obtained from the user database 109. Information provided by the history database 111 may be provided at any desired level of anonymity.

Support Database (113)

For at least one embodiment, a support database 113 may be configured to collect and provide data relating to one or more functions provided by a given user device 102 for use during a future arising seamless tuner session and/or to facilitate scheduling and/or cancelling a prior scheduling of a seamless tuner session on one or more LANs 118. The support database 113 may be configured to provide support features, such as tutorials or the like, that provide support for the scheduling of seamless tuner sessions and otherwise. Data provided in such a support database 113 may be used by a seamless engine 105.

Other Databases (115)

For at least one embodiment of the present disclosure, the storage module 106 may include the use, on a transient or non-transient basis, of other databases 115. The stored data in such other databases 115 being provided for execution and/or use, singularly or collectively, by the processor 104 and/or other components of a user device 102. Any type of stored data and associated computer instructions implemented for use of such stored data may be provided by the other databases 115 for use by a seamless engine 105 or otherwise.

Tuner Database (117)

For at least one embodiment, a tuner database 117 may be configured to collect information regarding tuners for scheduled for use during one or more future arising seamless tuner sessions. Such tuners may be grouped, designated, reserved, or otherwise associated for use with and/or during a seamless tuner session automatically, based on user input, or otherwise. As discussed above, a seamless tuner session may be specific to a given content source, a given LAN, a given collection of user devices, or otherwise. For example, a seamless tuner session may be scheduled to be formed with respect to all multiple content streams accessible using a common tuner and/or one or more common content processing operations. For another embodiment, the tuner database may identify content streams accessible to only certain user devices meeting certain criteria. For at least one embodiment, the tuner database 117 may be configured to categorize tuner use based upon user device, channel, time, user, and otherwise. Examples of such categorization are shown and further discussed in Seamless Tuners.

Timer Database (119)

For at least one embodiment, a timer database 119 may be configured to collect information regarding timers designating one or more future uses of one or more tuners. For at least one embodiment, such timers may designate one or more future arising seamless tuner sessions. Such timers may be grouped, designated, reserved, or otherwise associated for use with and/or during a seamless tuner session automatically, based on user input, or otherwise. A non-limiting example of a timer database 119 is shown in FIG. 2.

Figure 2:
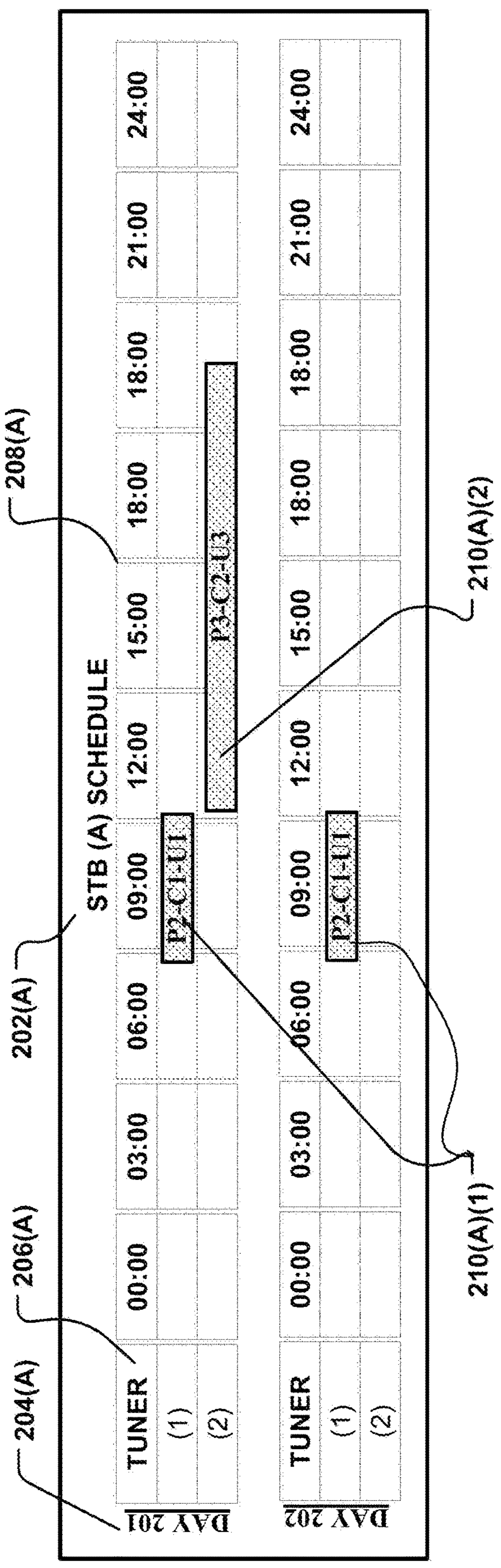
FIG. 2 is an illustrative representation of multiple tuners provided by STBs within a household and requests, via one or more timers, for use of such tuners and in accordance with at least one embodiment of the present disclosure to facilitate seamless use of timers across multiple devices within a local area network.

More specifically, for at least one embodiment, and as shown in FIG. 2, each user device 102 participating in a LAN 118 may include a storage module 106 that includes a timer database 119 that is populated with a time organized STB specific tuner schedule, such as a first STB schedule 202(A), a second STB schedule (not shown) and a third STB schedule (not shown). Each STB schedule identifies current and scheduled future uses of one or more tuners provided by that STB. As discussed above, such STBs having tuners are identified herein as user devices 102.

For at least one embodiment, a STB schedule 202 may include a time organized categorization of availability and use of tuners provided by a given STB. Such time organized categorization may be provided in any computer processable form and may be visually presented to a user in a grid, table, or other form. One representation of a time organized categorization may include a day field 204, which specifies a calendar day; two or more tuner fields 206, identifying the tuners provided by a given STB; and one or more time fields 208, which as shown has been divided into three (3) hour blocks for purposes of clarity only, it being appreciated that any desired designation of time may be used in a given embodiment. Further, a time organized categorization may include a timer identifier 210 of a current and/or any future scheduled uses of a given tuner. Such timer identifier 210 may be super-imposed upon, field entered, or otherwise populate a given STB schedule.

For at least one embodiment, a timer identifier 210 may include information identifying one or more timer parameters. Non-limiting examples of timer parameters may include a prioritization (P), a channel (C), a user identifier (U), and other information. For example, and for purposes of the present disclosure only, and not by means of limitation, a prioritization scheme may include uses, from a highest to lowest priority, of Emergency Broadcast Messaging (EBM) (P1), Auto-Tune (P2), pay-per-view (PPV) (P3), Original Content (OC) (P4), and Reruns (RR) (P5). Other tuner prioritization schemes may be used for other embodiments. Further, a channel parameter (C) may be represented by a program identifier, an alphanumeric title, an electronic program guide entry, or otherwise designate a source of the desired title. A user identifier (U) may identify a user requesting the timer and any desired designating scheme may be used such as, but not limited to, user number, user name, or otherwise.

As shown for illustrative purposes only, a first timer identifier 210(A)(1) includes a P2 prioritization parameter designating an auto-tune event for a title T1, and entered by a U1 user. As shown, the first timer identifier 210(A)(1) is scheduled on both of days 201 and 202, from approximately 09:00 to 12:00. As further shown for STB A, a second timer identifier 210(A)(2) is schedule for tuner 2 from approximately 12:00 to 18:30 on day 1 by user U2, for channel C2, and has a P3 (PPV) priority. It is to be appreciated that a request for a future timer may be scheduled by the seamless engine 105 in view of the priority of the already existing timers. Conflict resolution of scheduled timers and requested timers may be resolved using any desired resolution technique including, but not limited to, by priority, first in, last in, request user, or otherwise.

Further, for at least one embodiment, a timer identifier 210 may be specific to a given tuner. For example, timer requests for 4K content may be first resolved with respect to tuners supporting 4K content, with other non-4K requests being reassigned to tuners having lesser capabilities. Further, a timer may be designated for use with specific categories of tuner requests, such as Pay-Per-View (PPV) requests, emergency broadcast messaging request, or otherwise. For at least one embodiment, the scheduling of tuner use, by one or more timers, may be prioritized based upon, in whole or in part, information contained in a request type field, a priority field, or otherwise.

For at least one embodiment, timer requests may be prioritized based upon a requesting user. Such prioritization may arise with respect to all user devices 102 and/or to specific user devices 102 via which a given timer request is received.

Tuners available across all user devices on a given LAN 118 may be sequentially numbered, with tuners on a designated master user device having a higher designation than tuners on other devices. But, other designators and/or designation schemes may be used for other embodiments of the present disclosure.

In accordance with at least one embodiment, a system 100 may be configured such that tuners provided by a designated master user device are utilized primarily for timer requests received from users, via a user input device, communicating directly with such master user device. For at least one embodiment, tuners on a designated master user device may be reserved, when not requested by a user directly accessing such master user device, for use with timer requests received from one or more Joeys 103. For at least one embodiment, remote tuners may be reserved for use in conjunction with timer requests received from one or more designated users of such remote user devices. For example, a STB in a child's room may be designated for fulfillment of timer requests from the children in the household.

Figures 3A, 3B:
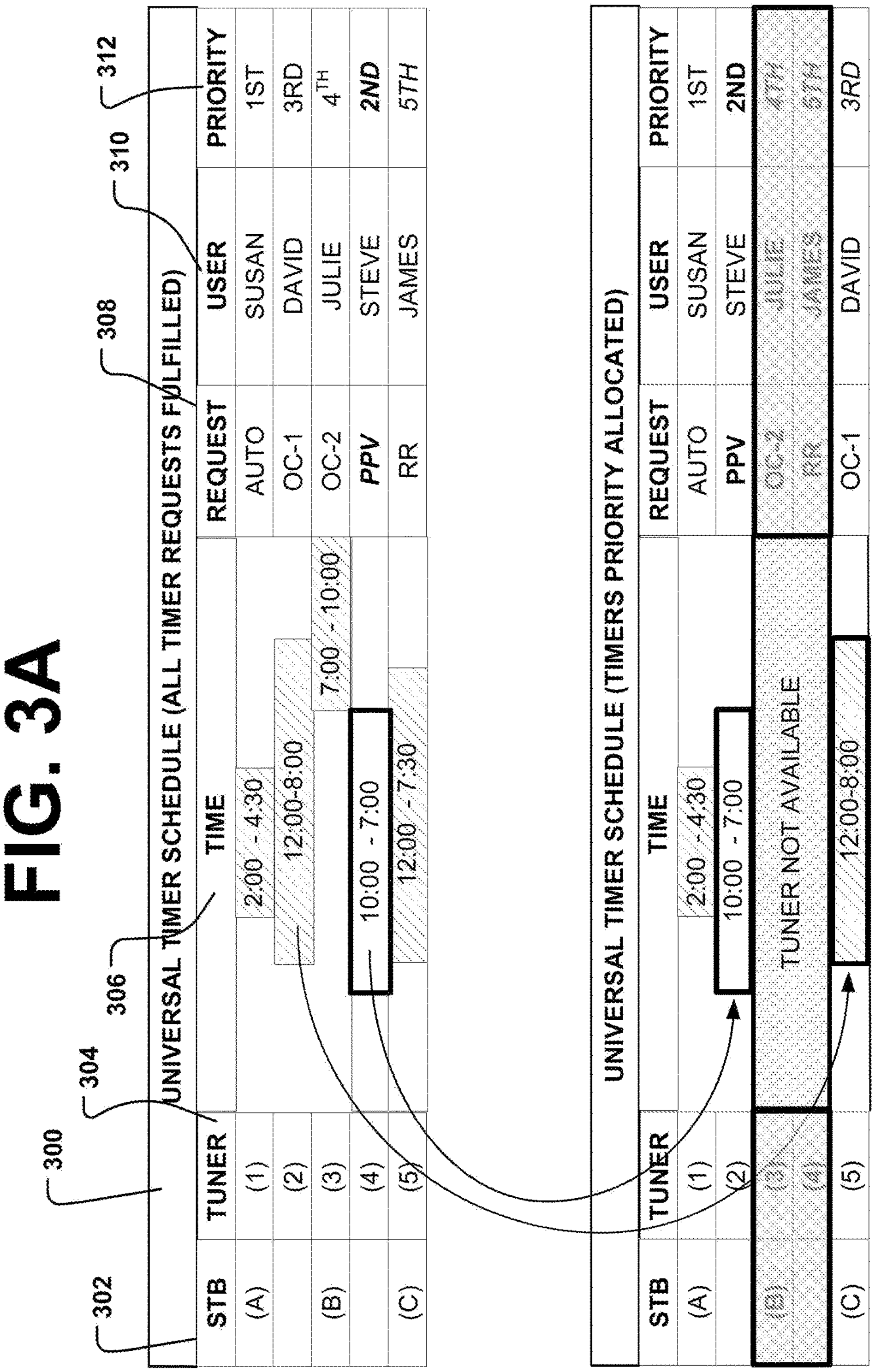
FIG. 3A is an illustrative representation of a universal directory populated without prioritization, where all timer requests can be fulfilled, and in accordance with at least one embodiment of the present disclosure to facilitate seamless use of multiple timers across multiple devices within a local area network.
FIG. 3B is an illustrative representation of a universal directory showing prioritized allocations of timers for those tuners available on then active STBs within a household, where all timer requests cannot be fulfilled, and in accordance with at least one embodiment of the present disclosure to facilitate seamless use of timer across multiple devices within a local area network.

As shown in FIGS. 3A and 3B and for at least one embodiment, when a LAN 118 is being formed and/or reconfigured, a universal timer schedule 300 may be populated, based upon tuners identified in each STB timer schedule 202, for each of the user devices 102 participating then on a given LAN 118 and scheduled uses of such tuners. As shown in FIGS. 3A and 3B, the universal timer schedule 300 may be populated, at a given time, as shown in FIG. 3A, based upon the participation thereof of each of the first user device 102(A), the second user device 102(B), and the third user device 102(C) on the given LAN 118. As shown in FIG. 3B, the second user device 102(B) is no longer participating on the LAN 118. Such non-participation may arise for any reason, such as the second user device 102(B) being unpowered, due to a use time window expiring, or otherwise.

As shown in FIG. 3A, certain timer is allocated to certain tuners based upon then available user devices. For example, tuner 1 (in STB (A)) is reserved for use with an autotune timer set by user "Susan" and is given a highest priority. Similarly, a PPV event requested by user "Steve" is reserved for use with tuner 4 (in STB (B)), and has been given a second highest priority.

As shown in FIG. 3B, however, when STB (B) is no longer available, a reallocation of timers may occur on an as needed basis. Such as when timer requests are expected to exceed tuners expected to be available. As shown, the PPV timer request from Steve may be allocated to tuner 5 (in STB (C)) and a previously fulfilled request by James for a RR may be cancelled. For at least one embodiment, the seamless engine 105 is configured to perform such timer allocations/ deallocations, as based upon timer request prioritization in view of user devices expected to be available at a given future time on a given LAN 118 and in view of any currently received, scheduled and/or outstanding timer requests.

For at least one embodiment, the seamless engine 105 executing in each user device 102 may populate their own instance of the universal timer schedule 300. For another embodiment, the universal timer schedule 300 may be populated by a user device 102 operating as a master and then communicated to each other user device 102 and/or Joey 103 participating on the LAN 118.

As shown in FIGS. 3A and 3B, the universal timer schedule 300 may include the source 204, DRM key 206, title 208, and user identifiers 210 (and any other desired identifiers). The universal timer schedule 300 may also be configured to include, for at least one embodiment, a STB data field 302 identifying the user device providing a given tuner, as identified in a tuner field 304. For at least one embodiment, the seamless engine 105 populating a given universal timer schedule 300 may be configured to include a time field 306. The time field 306 may provide an indication of when one or more tuners are reserved for use by one or more timers. The time field 306 may be presented to a user vertically, as shown in FIGS. 3A and 3B, horizontally, as shown in FIG. 2, or otherwise.

For at least one embodiment, the seamless engine 105 populating a given universal timer schedule 300 may be configured to include a request field 308. The request field 308 may identify a category of a tuner use/request, such as emergency, autotune, PPV, OC, or RR request. The universal timer schedule 300 may be configured to include a user field 310, identifying a user requesting/scheduling use of a given tuner, and a priority field 312, indicating a then arising priority of a given timer request.

For at least one embodiment, when a user device 102 is added or deleted from a LAN 118 a discovery process for content available across all user devices on the LAN 118 may be initiated. Such discovery process may be facilitated by each user device 102 reporting to other user devices 102 on the LAN 118 the status and any scheduled uses of one or more timers provided on a given user device. Such status information may be used in populating the universal timer schedule 300.

For at least one embodiment, a universal timer schedule 300 may be updated on a periodic or other basis. For example, every fifteen minutes, each user device 102 on a given LAN 118 may communicate an identifier of timer status, timer requests received, timer requests to be fulfilled, timer requests unfulfilled, timer requests dropped, and otherwise to each other user device 102 on that given LAN 118. Such identifier may include a minimum amount of information necessary to uniquely identify a status and future status, to the extent such future status is knowable, on a universal timer schedule 300.

For at least one embodiment, a user of a given user device may modify a local copy of a universal timer schedule provided by that given user device. Local modification of a universal timer schedule may also be populated to all other user devices 102 in the system 100 when the user so modifying has sufficient access privileges to so modify. For at least one embodiment, a user input to record a given title, then being presented, may take priority over a preexisting timer.

For at least one embodiment, a universal timer schedule 300 data field may also be dynamically populated and/or updated while a user input device, such as a cursor hovers or otherwise selects or indicates interest in a given timer. Thus, a timer status, priority thereof, user requesting, and the like may dynamically change based upon use thereof by one or more user devices on a given LAN 118 and user interest therein, with respect to a given user device 102. Such status indicators may also be populated with respect to other content processing operations and components configurable for use therewith.

Security Module (108)

For at least one embodiment, a user device 102 and/or Joey 103 may separately or using computer instructions executed by the processor module 104 provide a security module 108. The security module 108 provides a user device with capabilities of securing user participation on a LAN 118 and with respect to one or more sessions. The security module 108 may be configured to address security needs, including but not limited to, securing the identity of user devices 102 and/or Joeys 103, securing content communicated via a given LAN 118 and for a given session, and other security needs. The security module 108 may operate separately and/or in conjunction with security components provided by other components of a user device 102, Joey 103, and/or the system 100 including those provided by servers 122, content sources 116, and otherwise. Any desired known or later arising security technologies, protocols, approaches, schemes, or otherwise may be used in one or more embodiments of the present disclosure by the security module 108.

For at least one embodiment, the security module 108 on one or more, if not each, user device 102 and Joey 103 participating on a given LAN 118 may be configured to utilize a common household DRM key. Such common household key may facilitate access to content stored, in encrypted form, on each of the user devices participating on the given LAN 118. For other embodiments, a unique DRM key may be required to access unique content. For at least one embodiment, the security module 108 on each user device 102 and Joey 103 participating on a given LAN 118 may be configured to utilize other security keys, inter-device keys, for securing communications over the LAN 118. Such inter-device keys, may be based on any desired information, such as a customer billing number, a customer identifier, and/or other information, may be randomly generated, or otherwise. For at least one embodiment, as user devices join and/or leave a given LAN 118, one or more security keys may be dynamically adjusted, modified, or otherwise processed.

I/O Module(s) (110)

For at least one embodiment, user devices 102 and Joeys 103 may include one or more input/output ("I/O") module(s) 110. Such modules may include audio, visual, text, and/or gesture I/O module.

Audio I/O Module: Audio I/O modules may be configured to support the providing of audible signals between a user and a user device. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

For at least one embodiment, an audio I/O module generally includes hardware and software (herein, "audio technologies") which supports the input and (as desired) output of audible signals to a user. Such audible signals may include those arising from a given content. Such audio technologies may include technologies for converting human speech to text, text to speech, translation from a first language to one or more second languages, playback rate adjustment, playback frequency adjustment, volume adjustments and otherwise. Non-limiting examples of audio technologies that may be utilized in an audio I/O module include GOOGLE VOICE, SFTRANSCRIPTION, BRIGHTSCRIPT, GOOGLE ASSISTANT, SIRI, and others.

In at least one embodiment, an audio I/O module may be configured to use one or more microphones and speakers to capture and present audible information to a user. Such one or more microphones and speakers may be provided by a given user device 102 and/or Joey 103 itself or by a device communicatively coupled additional audible device component, for example, by earbuds may be communicatively coupled to a smartphone, with the earbuds functioning as an audio I/O module and capturing and presenting audio sounds to and from a user, while the smartphone functions as a user device 102 and/or Joey 103. Accordingly, it is to be appreciated that any existing or future arising audio I/O devices, systems and/or components may be utilized by and/or in conjunction with a user device 102 and/or Joey 103 to facilitate one or more embodiments of the present disclosure.

Visual I/O Module: For at least one embodiment, user devices 102 and Joeys 103 may include a visual I/O module configured to support the providing of visible signals between a user and a user device 102 or Joey 103. Such visible signals may be in any desired form, such as still images, motion images, augmented reality images, virtual reality images and otherwise. Such visible information may include one or more of humanly perceptible visible signals. For at least one embodiment, a visual I/O module may also be configured to capture non-humanly visible images, such as those arising in the X-ray, ultra-violet, infra-red or other spectrum ranges. Such non-humanly visible images may be converted, as desired, into humanly visibly perceptible images by a user device.

For at least one embodiment, a visual I/O module generally includes hardware and software (herein, "visible technologies") which supports the input by and (as desired) output of visible signals to a user. Such visible signals may include those arising from a given content. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O module may be configured to use one or more display devices configured to present visible information to user. A visual I/O module may be configured to use one or more image capture devices, such as those provided by lenses, digital image capture and processing software and the like which may be provided by a given user device 102 or Joey 103 itself or by a communicatively coupled additional image capture device component, for example, a remote camera in a vehicle or otherwise. Accordingly, it is to be appreciated that any existing or future arising visual I/O devices, systems and/or components may be utilized by and/or in conjunction with a user device 102 or Joey 103 to facilitate one or more embodiments of the present disclosure.

Text I/O Module: For at least one embodiment, user devices 102 and Joeys 103 may include a text I/O module configured to support the providing of textual information by a user using a user device 102 or Joey 103. Such textual information signals may be in any desired language, format, character set, or otherwise. Such textual information may include one or more of humanly perceptible characters, such as letters of the alphabet or otherwise. For at least one embodiment, a text I/O module may also be configured to capture textual information in first form, such as a first language, and convert such textual information into a second form, such as a second language. A text I/O module generally includes hardware and software (herein, "textual technologies") which supports the input by and (as desired) output of textual information signals to a user. In at least one embodiment, a text I/O module may be configured to use an input device, such as a keyboard, touch pad, mouse, or other device to capture textual information. It is to be appreciated that any existing or future arising text I/O devices, systems and/or components may be utilized by and/or in conjunction with one or more embodiments of the present disclosure.

Gesture I/O Module: For at least one embodiment, user devices 102 and Joeys 103 may include a gesture I/O module configured to support the providing of gesture information, such as sign language, by a user using a user device 102 or Joey 103. Such gesture information signals may be in any desired form or format. Such gesture information may include one or more of humanly perceptible characters, such as those provided by sign language. For at least one embodiment, a gesture I/O module may also be configured to capture a user's motions to control one or more aspects of a user device 102 or Joey 103; non-limiting examples of such motions including those commonly used on smartphone touch interfaces. A gesture I/O module generally includes hardware and software (herein, "gesture technologies") which supports the input by and (as desired) output of gesture information signals to a user. Such gesture technologies may include technologies for inputting, outputting, and converting gesture content into any given form, such as into textual information, audible information, visual information, device instructions or otherwise. In at least one embodiment, a gesture I/O module may be configured to use an input device, such as a motion detecting camera, touch pad, mouse, motion sensors, or other devices configured to capture motion information. It is to be appreciated that any existing or future arising gesture I/O devices, systems and/or components may be utilized by and/or in conjunction with a user device 102 or Joey 103 to facilitate the use of gesture information in furtherance of one or more seamless DVR sessions.

Interface Module (112)

As further shown in FIG. 1 and for at least one embodiment of the present disclosure, user devices 102 and Joeys 103 may include an interface module 112. The interface module 112 may include one or more components for use in forming a LAN 118 and facilitating one or more sessions. The interface module 112 may use any known or later arising technologies; non-limiting examples including hardware and software configured for use with one or more of the BLUETOOTH™, ZIGBEE™, Near Field Communications, Narrowband IOT, WIFI™, 3G, 4G, 5G, cellular, and other currently arising and/or future arising communications technologies. Any known or later arising networking and/or other communications technologies may be used to facilitate communications between user devices 102 and/or Joeys 103 over a LAN 118. For at least one embodiment, communications technologies for a given internal link 124 between a given user device 102, Joey 103, and a LAN 118 may vary by each link used. The interface 112, in conjunction with the seamless engine 105 may be configured to adapt to link types used based upon seamless timer then in use, and otherwise.

For at least one embodiment, the interface module 112 may be configured to include one or more data ports for establishing connections between a user device 102 and/or Joey 103 with a LAN 118. Such data ports may support any known or later arising technologies, such as USB 2.0™, USB 3.0™, ETHERNET™, FIREWIRE™, HDMI™, wireless technologies, and others. The interface module 112 may be configured to support the transfer of data formatted using any desired protocol and at any desired data rates/speeds between user devices 102 and Joeys 103 over the LAN 118. The interface module 112 may be connected to one or more antennas (not shown) to facilitate wireless data transfers. Such antenna may support short-range technologies, such as 802.11a/c/g/n and others, and/or long-range technologies, such as 4G, 5G, and others.

Receiver Module (112)

For at least one embodiment, a user device 102 may include a receiver module 112 configured to request and/or receive content from one or more content sources 116. Receiver modules 112 include tuner and other content processing components. Receiver modules 112, tuners and other content processing components are well known in the art and are not further described herein.

Figure 4:
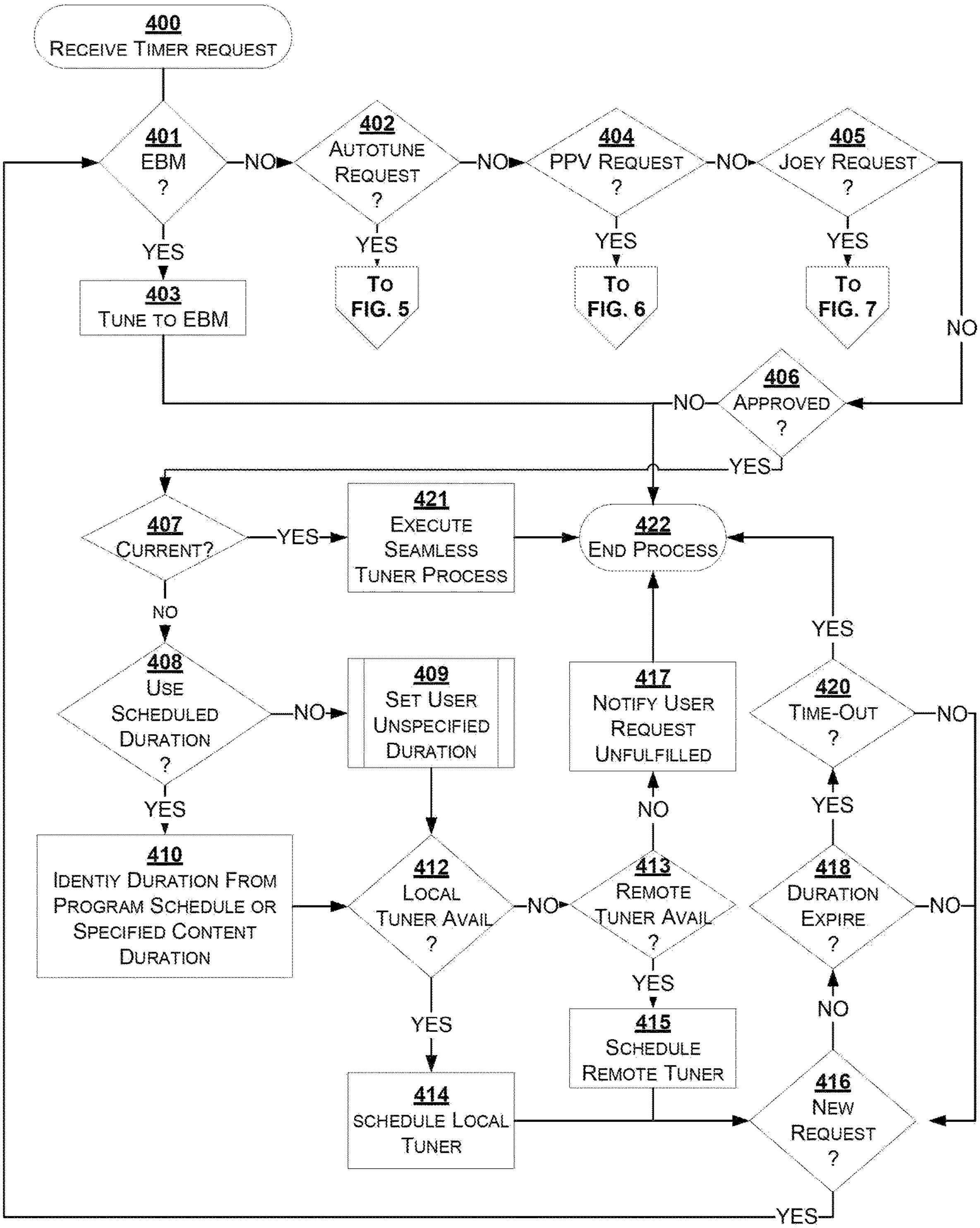
FIG. 4 is a flowchart illustrating a process for facilitating seamless use of timers and in accordance with use at least one embodiment of the present disclosure to facilitate seamless use of timers across multiple devices within a local area network.

In FIG. 4 and for at least one embodiment of the present disclosure, a process for facilitating seamless timers across multiple devices within a LAN is shown.

Per Operation 400, the process may begin with a user device 102 receiving a timer request. Such a request may occur under numerous conditions.

For example and not by limitation, a user device 102 may be configured to automatically activate upon receipt of an EBM request, as shown by Operations 401 and 403. For another example and not by limitation, a user device 102 may be requested to schedule an auto-tune for a desired channel, as shown by Operation 402, and as further described below with reference to FIG. 5. For example and not by limitation, a user device 102 may be requested to schedule a given PPV stream, as shown by Operation 404 and as further described below with reference to FIG. 6. For another example and not by limitation, a user device 102 may be requested to schedule a given channel under other conditions. Such process, for at least one embodiment, is further described with reference to FIG. 4. It is to be appreciated that a request to schedule an EBM, autotune, or PPV may be received by any user device 102 connected to the given LAN 118. Requests from Joeys are treated differently herein and with respect to at least one embodiment since a Joey, as defined herein, does not itself possess any local tuners and instead relies on tuners provided by one or more user devices 102 connected on a given LAN 118.

It is also to be appreciated that content provided by a given tuner may be shared, substantially simultaneously, with multiple user devices 102 and/or Joeys 103 on a given LAN 118. Accordingly, embodiments of the present disclosure may be configured to execute one or more operations of FIGS. 4-7 when a given request by a user of a first user device and/or Joey to schedule a timer impacting a then shared content stream will effect a viewing of such shared content stream by another user, using a second user device and/or Joey. It is to be appreciated that infinite scenario permutations may arise and decision processes associated therewith for determining which users, as associated with a user device and/or Joey, tuners, and/or other content processing components, are to be allocated, at any given time, to the providing of content to one or more user devices and/or Joeys. Such rules may be tailored, as desired, such as by a homeowner, by a default setting, or otherwise.

Further, it is to be appreciated that an allocation of a tuner and/or other content processing component, in response to a timer request may also trigger other processes in user devices and/or Joeys. Such other processes may include, for example and not by limitation, scheduling conflict resolution processes, as may arise when a current timer reallocation results in a rescheduling of a given content to a later arising time. Other processes may include notification processes, whereby a user device and/or Joey is configured to notify a user of a timer reallocation that will impact a current or future viewing of a given content.

Further, various processes of the current disclosure may also be configured to attend to timer scheduling and tuner allocation based upon when the timer is to be activated. For example, a timer request for a substantially immediately arising live programming versus recorded programming may be managed in different manners. For live programming, one or more content processing components, such as data buffers, may also be allocated. Such allocated buffers may be used to buffer a given quantity of content, while such content is received from a content source 116. Such buffering may be allocated based upon time, for example, such that a given quantity of content, as measured in time, is buffered prior to other content processing operations occurring. Yet, when multiple user devices/Joeys are seeking to access such buffered content, synchronization of such devices can be critical.

Accordingly, various processes of the present disclosure may include use of synchronization protocols. Such synchronization protocols may be performed by one or more interface modules 112 and/or receiver modules 114. For at least one embodiment, each user device 102 and Joey 103 on a given LAN 114 may have internal clocks that are time synchronized with a master clock. For at least one embodiment, such master clock may be provided by a designated master user device 102. For at least one embodiment, a designated master user device 102 may be configured to synchronize with an uplink center clock, an Internet server clock, a cable head-end clock, a GPS clock, or using another externally provided clocking signal (herein, each a "timing source").

For at least one embodiment, remote user devices and Joeys may be configured to facilitate synchronization with a master user device by use of one or more program clock recovery passing (PCRP) processes. A PCRP may be executed by a seamless engine 105 on each remote user device and Joey and facilitates a slowing, maintaining, and/or acceleration of a local clock, on such remote user device/Joey, in order to be in synchronization with a master clock signal, provided by a master user device. Well-known PINGs, and the like, may be used to determine network latency. Remote user device/Joey processing latency may also be used by the PCRP to adjust remote user device/Joey clocks such that synchronization with a master user device clock can be maintained.

For another embodiment, synchronization may occur by and between each user device, remote or otherwise, and a timing source. For at least one embodiment, Joey synchronization may arise with respect to a designated master user device.

Referring again to FIG. 4, the process may include, per Operation 406, a determination of whether a timer, or other content processing component, request is approved. Such approval may be based upon one or more channel authorizations, tuner authorizations, or otherwise. For at least one embodiment, approvals may occur at various other times during a timer allocation process. For at least one embodiment, timer authorizations for use of tuners and/or other content processing components may be made by the user device 102 receiving the timer request. Such approval processes are illustrated herein, only with respect to Operation 406, but, may arise at any process step for any process and is not to be considered as being limited to the shown FIG. 4 process. For at least one embodiment, approvals of timer requests for auto-tune events, PPV events, and the like may be limited to a requesting user device. For example, a timer request for a PPV event may be approved for presentation using a first user device 102(A) but may not be approved for presentation using a second user device 102(B).

In other embodiments, approvals of time requests may apply to any given or collection of user devices 102 and/or Joeys 103 then connected on a given LAN 118. For at least one embodiment, certain approvals may be provided on a user device basis, yet, user use rules, such as those provided by a content source, may permit scheduling viewing of a given content, such as a PPV movie, on any user device 102 and/or Joey 103 on a given LAN 118. Under such a scenario, security modules 108 on each user device 102 and/or Joey 103 may be configured such that a given timer request and PPV authorization are device specific. Thus, multiple PPV timer requests and authorizations may be needed. Under such a scenario, it is to be appreciated that an identification of each of the separately authorized user devices 102 and/or Joey 103 as being on a given LAN 118 may be provided to the content source 116 for the PPV content and reconciliation of any otherwise duplicate billings may be accomplished at the content source 116 and/or other servers 122.

As shown in FIG. 4 for at least one embodiment, when a timer request is denied, the process may end, per Operation 422. When the timer request is approved, the process may proceed to Operation 407.

Per Operation 407, the process may include a determination of whether a given timer request is for a current content. When the request is for current content, one or more operations may be performed to determine whether a timer is available. For at least one embodiment, such one or more operations may include one or more Seamless Tuner processes, as per Operation 421. When a future request is determined, the process may proceed to Operation 408.

Per Operation 408, the process may include an inquiry as to whether a request is for a scheduled duration or a user specified duration. For example, a requested presentation of a given episode of a content, where such episode is associated with a predetermined start and end time, may occur by use of a program guide or otherwise. Alternatively, a request to tune to a channel may occur for any specified or unspecified duration. It is to be appreciated that when content of a schedule duration is selected, an expectation may occur that the user so requesting desires to use a tuner for the entirety of the scheduled content. Accordingly, the process may proceed to Operation 410 and specified duration for the content (and associated therewith tuner and/or other content processing component need) identified. However, when an unspecified duration request is received, one or more additional processes may need to be set, such as future arising conflict checks, and the like. Accordingly, the process may proceed to Operation 409 with a specification of a user requested duration, which may include an indefinite designation. Each of Operations 409 and 401 then may proceed to Operation 412.

Per Operation 412, the process may include determining whether a "local" tuner is available to satisfy the timer request. As used herein, a "local" tuner corresponds to a user device 102 at which the timer request is first received from the user, for example, by use of a user input device. If a local tuner is available, the process may proceed to Operation 414. If a local tuner is not available, the process may proceed to Operation 413.

Per Operation 413, when a local tuner is not available, the process may include determining whether another tuner, provided by another user device 102 on the given LAN 118 will be available. Such determination may involve execution of one or more approval processes, as discussed above. If a remote tuner will not be available, the process may proceed to Operation 417—notification to the user that the request cannot be fulfilled—and to an ending of the process, per Operation 422. It is to be appreciated, however, that for other embodiments, other processes may be provided when a request for a timer (or other content processing component) cannot be locally and/or remotely fulfilled. One or more conflict resolution processes may be executed, by which an existing current or planned timer may be usurped, in whole or in part, in favor of a presently arising timer request. Such timer conflict resolution processes are well known and are not further discussed herein.

Per Operations 414 and 415, when available, a local tuner and/or a remote tuner may be allocated to fulfill the timer request. Once allocated, the process may proceed, at the designated timer start time, with tuning and/or otherwise processing the desired content, corresponding to the requested timer, being provided to the requesting user device. Such process may continue until a time-out occurs, a power-off occurs, a new request is received, as per Operation 416, or otherwise. As discussed above, it is to be appreciated that a new timer request and/or an immediate tuner request may be received with an appropriate user input, such as a channel change command, or otherwise. When a new timer and/or request is received, the process may return to Operation 401. When a new timer and/or tuner request is not received, the process may proceed to Operation 418—a determination of whether a given duration, when one is known and/or knowable, has expired for a given timer. If "no", the process may repeat Operations 416 and 418 until a time-out event occurs, as per Operation 420, at which event the timer and the process ends, as per Operation 422.

Figure 5:
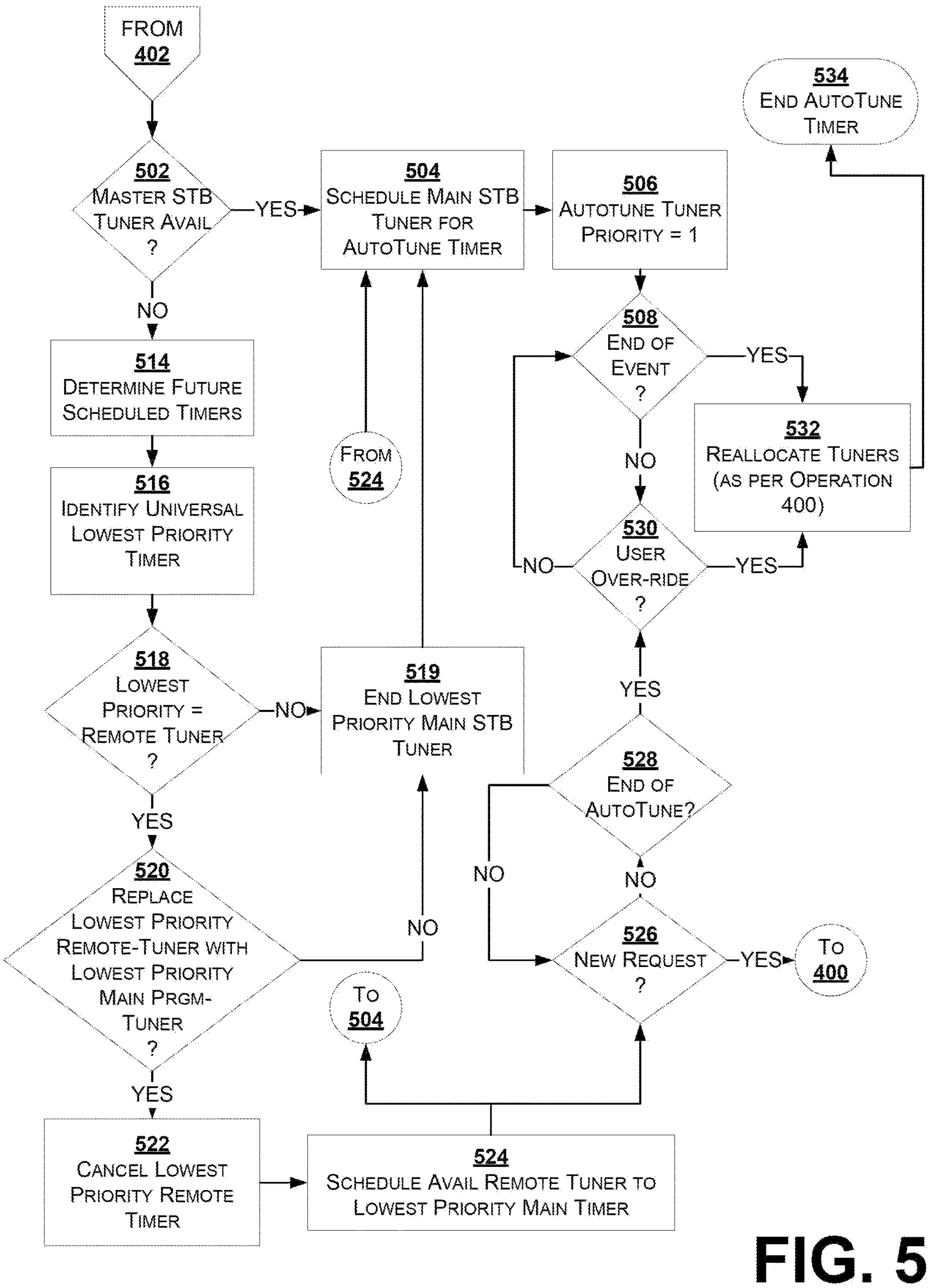
FIG. 5 is a flowchart illustrating a process for facilitating seamless use of timers, for autotune requests, and in accordance with use at least one embodiment of the present disclosure to facilitate seamless use of timers across multiple devices within a local area network.

Referring again to FIG. 4, Operation 402, when a request for an auto-tune timer is received, the process may include one or more operations shown in FIG. 5.

Per Operation 502, the process may include determining whether a master STB tuner will be available to satisfy the timer request. It is to be appreciated that for at least one embodiments, a system 100 may be configured such that auto-tune timer requests are processed first, when possible, by a master STB/user device 102, such as a DISH HOPPER. For at least one embodiment, the master STB/user device 102 may be configured to include tuners and/or other content processing components best configured for use with auto-tune content—content that a given user has indicated is of particular interest thereto. If a master STB tuner will be available at the requested time and for the requested duration, the process may proceed to Operation 504. If not, the process may proceed to Operation 514.

Per Operation 504, when a master STB tuner will be available for the auto-tune timer, a tuner may be scheduled by the master STB to autotune to the desired event when the timer is active. As used herein, an "event" refers to a selection of a given content, from an identified content source, for a given duration. The process may further include Operation 506.

Per Operation 506, the process may include designating the auto-tune timer with a priority indicators, such as a priority "1"—indicating a highest priority. A priority indicator may be used by conflict resolution procedures to enable a user device to automatically resolve timer and/or tuner request conflicts. It is to be appreciated that one or more auto-tune timers may simultaneously each have the same priority. When such a situation occurs and a an actual or anticipated tuner (or other content processing component) shortage arises or will arise, other information may be used in resolving such conflicts. Such other information may be provided, for at least one embodiment, by one or more of the content database 107, user database 109, history database 111, or otherwise.

Per Operation 508, the process may include scheduling the given tuner to tune to the auto-tune event at the designated time. For at least one embodiment, such tuning may occur until a pre-determined, determined and/or manually inputted end to the event occurs. If so, the process may end the autotune allocation and the autotune timer is cancelled, as per Operations 532 and 534. If the event end has not been reached, the process may include awaiting a user over-ride action, as per Operation 530. For example, an autotune event may tune to a previously broadcast (or otherwise provided) version of a given content episode. Upon tuning to such event, a user may realize, at any time, that they have already seen the episode and thus executes a channel change operation. When such a channel change occurs, the user's actions may trigger a new tuner request and the process may resume at Operation 400.

Referring again to Operation 502, when a tuner is not available on the master STB/user device, the process may proceed to Operation 514.

Per Operation 514, the process may include determining future scheduled timers. Such determination may be made by querying each user device then on a given LAN, referring to a universal timer schedule, or otherwise.

Per Operation 516, the process may include identifying the lowest priority timer scheduled. It is to be appreciated that such determination may be made in view of the type of event (e.g., a 4K content event versus a 1080P content event), future timers, and other considerations. Such lowest priority timer may be designated to trigger for use of a tuner on master STB and/or a remote STB.

Per Operation 518, the process may include determining if the lower priority timer is to be fulfilled by use of a remote tuner, i.e., a tuner to be provided by a remote user device/STB. If "no," the process may proceed to Operation 519. If "yes," the process may proceed to Operation 520. For at least one embodiment, Operation 518 may be performed at a time substantially proximate to an activation time for a given timer. For other embodiments, Operation 518 may be performed at time of timer creation, whenever timer requests are received, whenever a status of user devices 102 on a given LAN 118 changes, or otherwise.

Per Operation 519, when the lowest priority timer is not to be fulfilled by use of a remote tuner, by default, it is assumed to arise on the main/master STB. Accordingly, the lowest priority timer is ended/cancelled and the process proceeds to Operation 504.

Per Operation 520, when the lowest priority timer is to be fulfilled by use of a remote tuner, the process may include replacing the lowest priority remote timer with the lowest priority timer provided by the main/master STB. It is to be appreciated, that such a process approach may be used to satisfy a preference to have auto-tune timer executed on the main/master STB. When such a preference does not exist, the process may include replacing the lowest priority remote timer with the new auto-tune timer request.

Per Operation 522, the process may also include cancelling the lowest priority remote timer. It is to be appreciated that Operation 522 may occur simultaneously with Operation 520 when an immediate need to tune to the auto-tune event exists. However, when an auto-tune event arises in a near future, for example, within a next fifteen (15) minutes or less, an immediate need to terminate the lowest priority remote timer may not exist. Accordingly, Operation 522 may be delayed until a start time for, or a designated time before, a requested auto-tune event occurs.

Per Operation 524, the process may include scheduling the lowest priority remote timer to the lowest priority main/master timer. It is to be appreciated that allocation of the lowest priority main/master timer to the lowest priority remote timer effectively shifts a timer request for a low, if not the lowest, priority program to a remote STB and frees the main/master STB for use with higher priority timer requests. As shown, the process may then proceed in parallel with Operation 504, by which the auto-tune event is received, etc. and with Operation 526.

Per Operations 526 and 528, the process may include awaiting detection of any new timer and/or tuner requests until the autotune event ends. If any such new requests are received, the process may proceed with Operation 400. When the autotune event ends, for at least one embodiment, a process for reallocating tuners may occur. Such process may be subject to user over-rides, as per Operation 530. User over-rides may occur based upon inputs received from a user via the I/O module 110. If no user over-rides are received, then tuners may be reallocated, as based upon received tuner requests and received timer requests, as per Operations 532 and 534.

Figure 6:
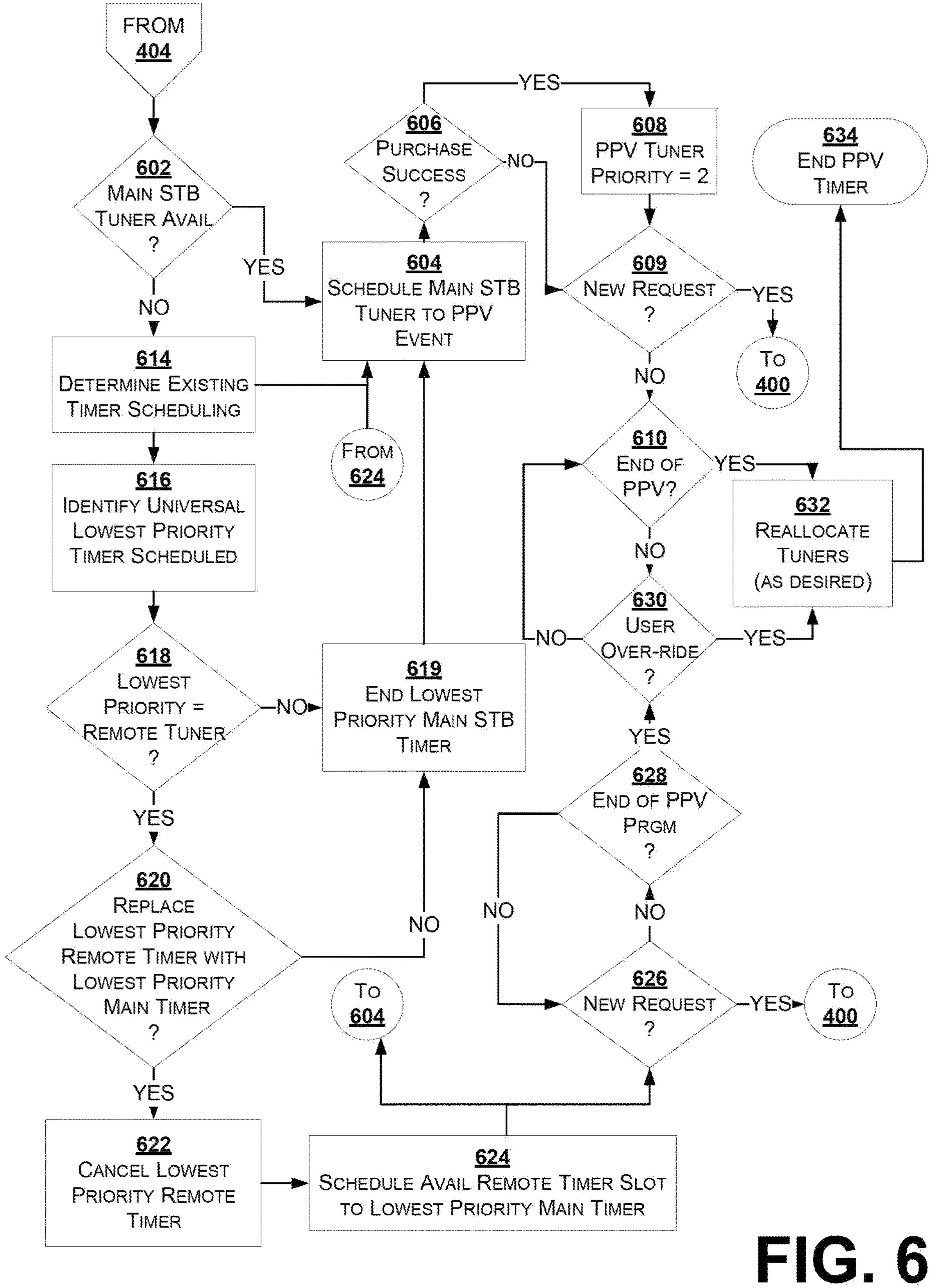
FIG. 6 is a flowchart illustrating a process for facilitating seamless use of timers, for pay-per-view (PPV) requests, and in accordance with use at least one embodiment of the present disclosure to facilitate seamless use of timers across multiple devices within a local area network.

Referring again to FIG. 4, Operation 404, when a timer request for a PPV event is received, the process may include one or more operations shown in FIG. 6.

Per Operation 602, the process may include determining whether a main/master STB tuner will be available. It is to be appreciated that for at least one embodiments, a system 100 may be configured such that timer requests and actual PPV events are processed, when possible, by a master STB/user device 102, such as a DISH HOPPER. For at least one embodiment, the master STB/user device 102 may be configured to include tuners and/or other content processing components best configured for use with PPV content—content that a given user has indicated is of particular interest thereto. If a main/master STB tuner is available, the process may proceed to Operation 604. If not, the process may proceed to Operation 614.

Per Operation 604, when a main/master STB tuner is available for the requested PPV event, a tuner may be scheduled by the main/master STB to tune to the desired PPV event at the requested time. The process may further include Operation 606.

Per Operation 606, the process may include determining whether the PPV event has then, or previously been purchased. It is to be appreciated that such an operation is a form of an approval operation which, as discussed above, may occur at any time during any of the processes of the present embodiment. If the PPV event has been purchased, the process may proceed to Operation 608, as discussed further below. If the PPV event has not been purchased, the process may proceed to Operation 609 during which a determination may be made as to whether a new timer or tuner request has been received, if so the process may proceed to Operation 400, or if PPV event has ended, per Operation 610, as discussed further below.

Per Operation 608, the process may include designating the timer request for the PPV event with a priority indicators, such as a priority "2"—indicating a second highest priority. A priority indicator may be used by conflict resolution procedures to enable a user device to automatically resolve timer and tuner request conflicts. It is to be appreciated that one or more timer request for and actual PPV events may simultaneously each have the same priority. When such a situation occurs and a current or future tuner (or other content processing component) shortage arises or will arise, other information may be used in resolving such conflicts. Such other information may be provided, for at least one embodiment, by one or more of the content database 107, user database 109, history database 111, or otherwise.

Per Operation 610, the process may include, for example at the time of timer activation, allocating the given tuner to the PPV event until a pre-determined, determined and/or manually inputted end to the event occurs. If so, the process may include reallocating tuners and end the PPV timer as per Operations 632 and 634. If the event end has not been reached, the process may include awaiting a user over-ride action, as per Operation 630.

Referring again to Operation 602, when a main/master tuner is not available to fulfill the timer request for the PPV event, the process may proceed to Operation 614.

Per Operation 614, the process may include determining existing timer scheduling. Such determination may be made by querying each user device then on a given LAN, referring to a universal timer schedule, or otherwise.

Per Operation 616, the process may include identifying the lowest priority timer scheduled. It is to be appreciated that such determination may be made in view of the type of event (e.g., a 4K content event versus a 1080P content event), future occurring timer reservations, and other considerations. Such lowest priority timer may arise with respect to a tuner on a master STB and/or a remote STB.

Per Operation 618, the process may include determining if the lower priority timer is to be fulfilled by use of a remote tuner, i.e., a tuner provided by a remote user device/STB. If "no," the process may proceed to Operation 619. If "yes," the process may proceed to Operation 620.

Per Operation 619, when the lowest priority timer is not to be fulfilled by use of a remote tuner, by default, it is assumed the timer is to be fulfilled by use of a tuner on the main/master STB. Accordingly, the lowest priority main STB time is ended/cancelled and the process proceeds to Operation 604.

Per Operation 620, when the lowest priority timer is to be fulfilled by a remote tuner, the process may include replacing the lowest priority remote timer with the lowest priority timer provided by the main/master STB. It is to be appreciated, that such a process approach may be used to satisfy a preference to have PPV timers executed on the main/master STB. When such a preference does not exist, the process may include replacing the lowest priority remote timer with the new PPV timer request.

Per Operation 622, the process may also include cancelling the lowest priority remote timer. It is to be appreciated that Operation 622 may occur simultaneously with Operation 620 when an immediate need to tune to the auto-tune event exists. However, when a PPV event arises in a near future, for example, within a next fifteen (15) minutes or less, an immediate need to terminate the lowest priority remote timer may not exist. Accordingly, Operation 522 may be delayed until a start time for, or designated time before, the PPV event occurs.

Per Operation 624, the process may include scheduling the lowest priority remote timer to the lowest priority main/master timer. It is to be appreciated that scheduling of the lowest priority main/master timer to the lowest priority remote timer effectively shifts a then arising low, if not lowest, priority timer to a remote STB and frees the main/master STB for use in receiving and processing higher priority timer request, such as those for a PPV event. As shown, the process may then proceed in parallel with Operation 604, by which the PPV event is received and processed and with Operation 626.

Per Operations 626 and 628, the process may include awaiting detection of any new timer and/or tuner requests until the PPV event ends. If any such new requests are received, the process may proceed with Operation 400. When the PPV event ends, for at least one embodiment, a process for reallocating timer and tuners may occur. Such process may be subject to user over-rides, as per Operation 630. User over-rides may occur based upon inputs received from a user via the I/O module 110. If no user over-rides are received, then timer and tuners may be rescheduled and reallocated, as based upon received timer and/or tuner requests, as per Operations 632 and 634.

Figure 7:
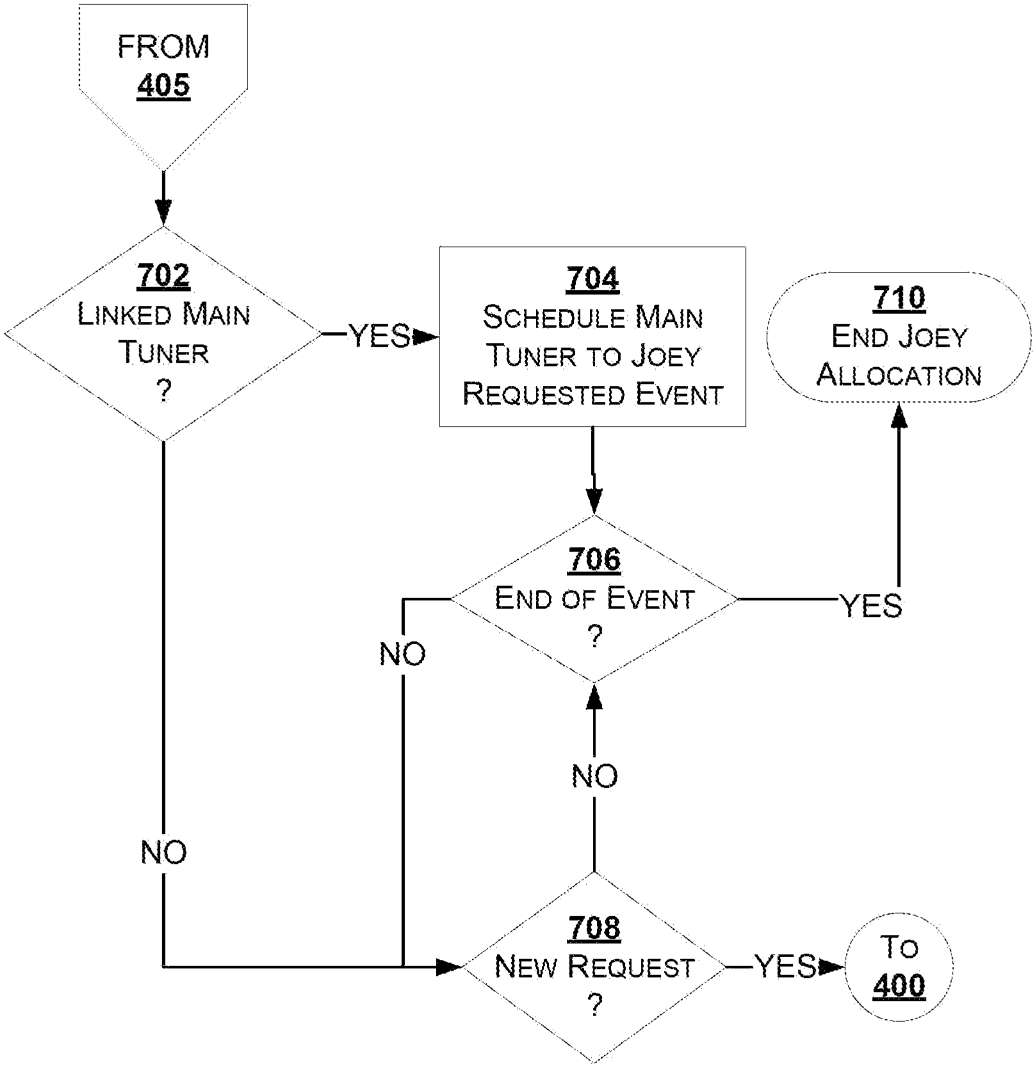
FIG. 7 is a flowchart illustrating a process for facilitating seamless use of timers, for timer requests received by client devices (herein, each a "Joey"), and in accordance with use at least one embodiment of the present disclosure to facilitate seamless use of timers across multiple devices within a local area network.

Referring again to FIG. 4, Operation 404, when a timer request from a Joey 103 is received, the process may include one or more operations shown in FIG. 7.

Per Operation 702, the process may include determining whether a main tuner, provided by a user device 102, is linked to the Joey 103 and will be available at the requested time. A linked main tuner indicates that a tuner on a user device 102 is dedicated for use with the Joey 103. If a tuner is linked, the process may proceed to Operation 704. If not, the process may proceed to Operation 714.

Per Operation 704, when a main/master STB tuner on a user device 102 is linked to the requesting Joey 103 and available at the requested time, the linked tuner may be scheduled by the main/master STB to tune to the desired event.

Per Operation 706, the allocation may occur until the event ends or per Operation 708 a new request is received, at which instance the process may proceed to Operation 400.

It is to be appreciated, that a shown per FIG. 7 and for at least one embodiment of the present disclosure, Joeys 103 are dependent on a linked main tuner on a user device 102. When such linkage does not exist, the Joey 103 is rendered unusable. For other embodiments, a Joey 103 may be configured for use with a remote and non-linked main STB. Under such a scenario, one or more of Operations 407 to 422 may be used to process a Joey 103 timer request. Further, for at least one embodiment, Joey 103 timer requests may be relegated to any desired priority. Such priority may be based upon information provided in one or more of the user database and/or history database.

It is to be appreciated that the process flows shown in FIGS. 4-7 and discussed above are for illustrative purposes only and are not to be considered limiting an embodiment of the present disclosure or an implementation thereof to any specific sequence of operations.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A non-transitory machine-readable storage medium, having stored thereon instructions which cause processors in electronic devices to perform operations, the operations comprising:

facilitating, in a first electronic device, a first seamless timer manager performing first operations comprising:

populating a first instance of a universal timer schedule;

facilitating, in a second electronic device, a second seamless timer manager performing second operations comprising:

populating a second instance of a universal timer schedule;

wherein the first electronic device is communicatively coupled to a local area network (LAN);

wherein the first electronic device comprises a first tuner;

wherein the second electronic device is communicatively coupled to the LAN;

wherein the second electronic device comprises a second tuner; and wherein the first instance of the universal timer schedule and the second instance of the universal timer schedule identify at least one of a future availability and a future use for the first tuner and for the second tuner.

2. The non-transitory machine-readable storage medium of claim 1, wherein the first operations further comprise:

determining first tuner availability for the first tuner; and communicating the first tuner availability to the second tuner; and wherein the second operations further comprise:

determining second tuner availability for the second tuner; and communicating the second tuner availability to the first tuner.

3. The non-transitory machine-readable storage medium of claim 2, wherein the populating of the first instance of the universal timer schedule is populated based upon a request.

4. The non-transitory machine-readable storage medium of claim 3, wherein the request is a Joey request;

wherein at least one of the first tuner and the second tuner may be configured as a linked main tuner; and wherein, for a Joey request, an available linked main tuner is scheduled for future use by a Joey.

5. The non-transitory machine-readable storage medium of claim 3, wherein the request is one of an auto-tune request, a pay-per-view (PPV) request, an original content request, and a re-run request; and wherein the auto-tune request has a higher separate priority than the PPV request.

6. The non-transitory machine-readable storage medium of claim 5, wherein the PPV request has a higher priority than the original content request.

7. The non-transitory machine-readable storage medium of claim 5, wherein the original content request has a higher separate priority than the re-run request.

8. The non-transitory machine-readable storage medium of claim 1, wherein the first electronic device further comprises:

a first storage module further comprising:

a first schedule identifying a scheduled first use for the first tuner;

wherein the second electronic device further comprises:

a second storage module further comprising:

a second schedule identifying a scheduled second use for the second tuner; and wherein contents of the first schedule and the second schedule are used to populate the first instance of the universal timer schedule and the second instance of the universal timer schedule.

9. The non-transitory machine-readable storage medium of claim 8, wherein the first instance of the universal timer schedule and the second instance of the universal timer schedule contain identical data.

10. The non-transitory machine-readable storage medium of claim 8, wherein the first operations and the second operations further comprise:

cooperatively processing a new timer request in view of the scheduled first use, the scheduled second use, and a priority of the new timer request; and wherein the new timer request identifies a future use of a tuner selected from at least one of the first tuner and the second tuner.

11. The non-transitory machine-readable storage medium of claim 10, wherein the priority is one of an emergency broadcast message, an auto-tune, a pay-per-view, an original content, and a rerun.

12. The non-transitory machine-readable storage medium of claim 10, wherein, when the new timer request is received from a Joey, the first electronic device determines whether a linked main tuner will be available.

13. The non-transitory machine-readable storage medium of claim 1, wherein the first electronic device further comprises:

a first storage module storing user preference information in a user database; and wherein the first operations further comprise:

populating the first instance of the universal timer schedule and the second instance of the universal timer schedule in view of the user preference information.

14. A non-transitory machine-readable storage medium, having stored thereon instructions which cause processors in electronic devices to perform operations, the operations comprising:

executing, in a first electronic device, a first seamless timer manager performing first operations comprising:

first populating, by the first seamless timer manager, a first instance of a universal timer schedule;

first storing the first instance of the universal timer schedule in a first storage location in the first electronic device;

executing, in a second electronic device, a second seamless timer manager performing second operations comprising:

second populating, by the second seamless timer manager, a second instance of a universal timer schedule;

second storing the second instance of the universal timer schedule in a second storage location in the second electronic device;

wherein the first electronic device is communicatively coupled to a local area network (LAN);

wherein the first electronic device comprises a first tuner;

wherein the second electronic device is communicatively coupled to the LAN;

wherein the second electronic device comprises a second tuner; and wherein the first instance of the universal timer schedule and the second instance of the universal timer schedule each identify at least one of a future availability and a future use for the first tuner and for the second tuner;

wherein the first operations further comprise:

determining first tuner availability for the first tuner; and communicating the first tuner availability to the second tuner; and wherein the second operations further comprise:

determining second tuner availability for the second tuner; and communicating the second tuner availability to the first tuner wherein the operations further comprise:

facilitating, in a third electronic device, a third seamless timer manager performing third operations comprising:

populate a third instance of the universal timer schedule;

wherein the third electronic device is communicatively coupled to the LAN;

wherein the third electronic devices comprises a third tuner; and wherein the first instance of the universal timer schedule, the second instance of the universal timer schedule, and the third instance of the universal timer schedule identify at least one of a future availability and a future use for the first tuner, the second tuner and the third tuner.

15. The non-transitory machine-readable storage medium of claim 14, wherein the universal timer schedule identifies a priority for a scheduled future use of the first tuner, the second tuner, and the third tuner.

16. A non-transitory machine-readable storage medium, having stored thereon instructions which case a processor in a first electronic device to perform operations, the operations comprising:

maintaining, on a first device, a first schedule for a first tuner;

receiving a second schedule for a second tuner; and populating a first universal timer schedule based on the first schedule and the second schedule; and wherein the first universal timer schedule identifies scheduled uses for the first tuner and the second tuner;

wherein the first tuner is provided by the first device; and wherein the second tuner is provided by a second device.

17. The non-transitory machine-readable storage medium of claim 16, wherein the operations further comprise:

communicating the first schedule to the second device.

18. The non-transitory machine-readable storage medium of claim 17, wherein the first device is coupled to the second device via a local area network.

19. The non-transitory machine-readable storage medium of claim 16, wherein the operations further comprise:

prioritizing a new schedule request based on a request.

20. The non-transitory machine-readable storage medium of claim 19, wherein the request is selected from a highest to lowest ranked ordering comprising at least two or more of an auto-tune request, a PPV request, an original content request, a rerun request, and a Joey request.

* * * * *